US009584686B2

(12) United States Patent
Yamamizu

(10) Patent No.: US 9,584,686 B2
(45) Date of Patent: Feb. 28, 2017

(54) IMAGE FORMING APPARATUS AND CONTROLLING METHOD FOR THE SAME

(71) Applicant: CANON KABUSHIKI KAISHA, Tokyo (JP)

(72) Inventor: Hiroshi Yamamizu, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/978,273

(22) Filed: Dec. 22, 2015

(65) Prior Publication Data

US 2016/0112593 A1 Apr. 21, 2016

Related U.S. Application Data

(63) Continuation of application No. 14/532,997, filed on Nov. 4, 2014, now Pat. No. 9,253,354.

(30) Foreign Application Priority Data

Nov. 7, 2013 (JP) .................................. 2013-231587

(51) Int. Cl.
*G06F 3/12* (2006.01)
*H04N 1/00* (2006.01)
(Continued)

(52) U.S. Cl.
CPC ..... *H04N 1/00896* (2013.01); *G03G 15/5004* (2013.01); *G03G 15/5016* (2013.01);
(Continued)

(58) Field of Classification Search
CPC ....... H04N 1/00896; H04N 2201/0094; H04N 1/00885; H04N 2201/0093; G06F 3/1221;
(Continued)

(56) References Cited

U.S. PATENT DOCUMENTS

| 5,708,821 A | * | 1/1998 | Takikita | ................ | B41J 29/387 |
| | | | | | 358/1.14 |
| 7,583,910 B2 | * | 9/2009 | Matsumoto | ........ | G03G 15/2039 |
| | | | | | 399/69 |

(Continued)

FOREIGN PATENT DOCUMENTS

| JP | H09-307672 A | 11/1997 |
| JP | 2007-043665 A | 2/2007 |

(Continued)

*Primary Examiner* — Negussie Worku
(74) *Attorney, Agent, or Firm* — Canon U.S.A., Inc. IP Division

(57) ABSTRACT

An image forming apparatus includes an image forming unit configured to form an image on a sheet based on image data, a control unit configured to control driving of the image forming unit, and a power supply unit configured to, if a factor for shifting from a power saving state to a standby state is detected, supply power to the image forming unit and the control unit. If a first type of factor is detected as the factor in the power saving state, the power supply unit supplies power to the control unit and the image forming unit, and the control unit restricts the driving of the image forming unit. If an instruction to perform a function of forming an image on a sheet is accepted, the control unit cancels restriction of the driving of the image forming unit.

15 Claims, 20 Drawing Sheets

(51) Int. Cl.
*G06K 15/00* (2006.01)
*G06K 15/14* (2006.01)
*G03G 15/00* (2006.01)

(52) U.S. Cl.
CPC ........... *G06K 15/14* (2013.01); *G06K 15/406* (2013.01); *G06K 15/4055* (2013.01); *H04N 1/00408* (2013.01); *H04N 1/00411* (2013.01); *H04N 2201/0081* (2013.01); *H04N 2201/0094* (2013.01)

(58) Field of Classification Search
CPC .... G06F 1/3284; G06F 3/1229; G06F 1/1279; G06F 1/3203; G06F 1/3206; G06F 3/1236; G06F 1/3287; G06F 1/325
USPC ............. 358/1.14, 1.13, 1.15, 1.1, 1.16, 1.9; 399/88, 69, 75, 33, 67, 70, 37, 38, 44, 81, 399/92, 97
See application file for complete search history.

(56) References Cited

U.S. PATENT DOCUMENTS

| | | | | |
|---|---|---|---|---|
| 7,877,617 | B2* | 1/2011 | Kaneda | G03G 15/5004 713/300 |
| 7,882,371 | B2* | 2/2011 | Yano | G03G 15/5004 399/88 |
| 8,099,613 | B2* | 1/2012 | Suzuki | G03G 15/5004 713/320 |
| 8,405,855 | B2* | 3/2013 | Asakawa | H04N 1/00408 358/1.15 |
| 9,253,354 | B2* | 2/2016 | Yamamizu | G03G 15/5004 |
| 2005/0138447 | A1* | 6/2005 | Kobayashi | H04N 1/00896 713/300 |
| 2008/0114996 | A1* | 5/2008 | Suzuki | G03G 15/5004 713/320 |
| 2010/0166448 | A1* | 7/2010 | Mikami | G03G 15/5004 399/88 |
| 2010/0325711 | A1* | 12/2010 | Etchegoyen | H04L 63/0272 726/7 |
| 2011/0282512 | A1* | 11/2011 | Shimizu | G06F 1/263 700/297 |
| 2011/0296217 | A1* | 12/2011 | Nishimura | G06F 1/3215 713/323 |
| 2012/0224206 | A1* | 9/2012 | Takahashi | G06F 3/1229 358/1.13 |
| 2013/0286423 | A1 | 10/2013 | Fuchimoto | |
| 2014/0104636 | A1* | 4/2014 | Baba | H04N 1/00323 358/1.14 |
| 2014/0173315 | A1* | 6/2014 | Yokoyama | G06F 1/3231 713/323 |
| 2014/0176977 | A1* | 6/2014 | Morita | H04N 1/00323 358/1.13 |
| 2014/0368855 | A1* | 12/2014 | Yamano | G06K 15/406 358/1.13 |
| 2015/0022837 | A1* | 1/2015 | Kuroishi | G06K 15/4055 358/1.13 |
| 2015/0124275 | A1* | 5/2015 | Yamamizu | G03G 15/5004 358/1.13 |
| 2015/0350478 | A1* | 12/2015 | Hibino | H04N 1/00904 358/1.13 |

FOREIGN PATENT DOCUMENTS

| | | |
|---|---|---|
| JP | 2012-213133 A | 11/2012 |
| JP | 2013020048 A | 1/2013 |

* cited by examiner

FIG.6

| | RAM | POWER SUPPLY CONTROL UNIT | LAN CONTROLLER | HUMAN BODY DETECTION SENSOR | DOCUMENT DETECTION SENSOR | SHEET DETECTION SENSOR | CPU | ROM | HDD | OPERATION UNIT BUTTONS | OPERATION UNIT DISPLAY UNIT | IMAGE PROCESSING UNIT | PRINTER CONTROL UNIT | SCANNER CONTROL UNIT | PRINTER DRIVE UNIT | SCANNER DRIVE UNIT |
|---|---|---|---|---|---|---|---|---|---|---|---|---|---|---|---|---|
| STANDBY STATE | O | O | O | O | O | O | O | O | O | O | O | O | O | O | O | O |
| FIRST SLEEP STATE | O | O | O | O | O | O | O | O | O | O | × | × | × | × | × | × |
| ADJUSTMENT STATE | O | O | O | O | O | O | × | × | × | O | × | × | O | × | O | × |
| SECOND SLEEP STATE | O | O | O | O | O | O | × | × | × | O | × | × | × | × | × | × |
| POWER OFF STATE | × | × | × | × | × | × | × | × | × | × | × | × | × | × | × | × |

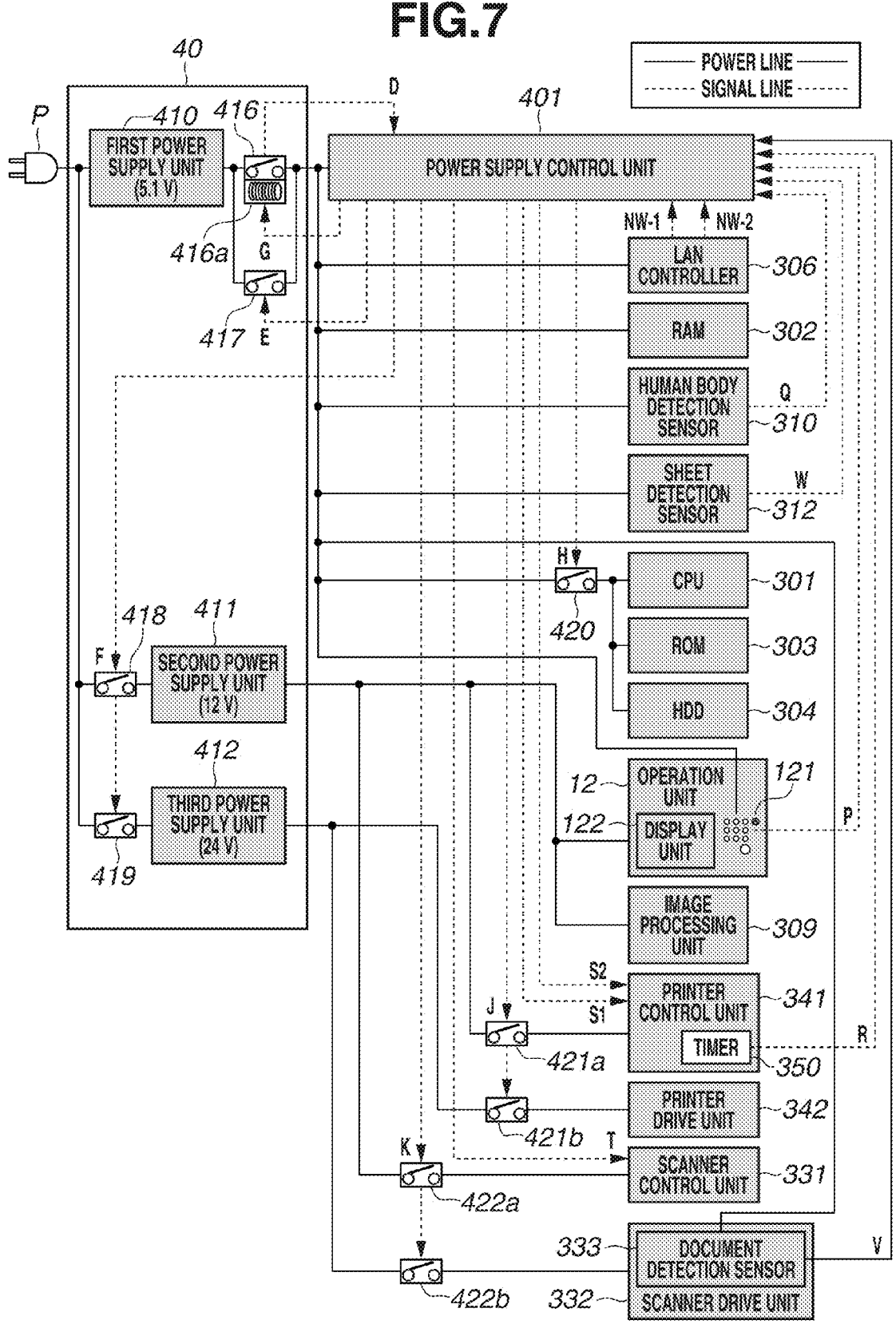

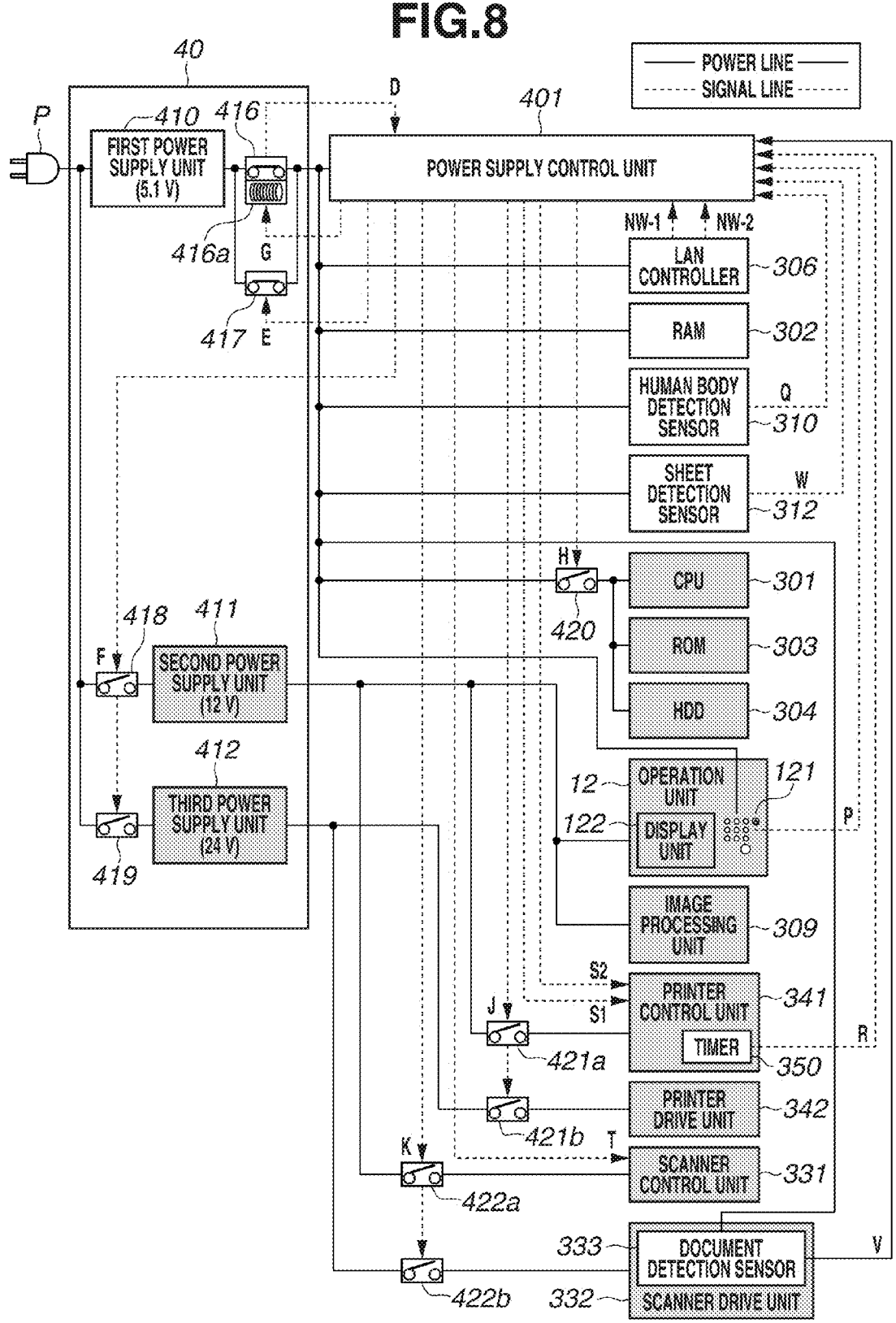

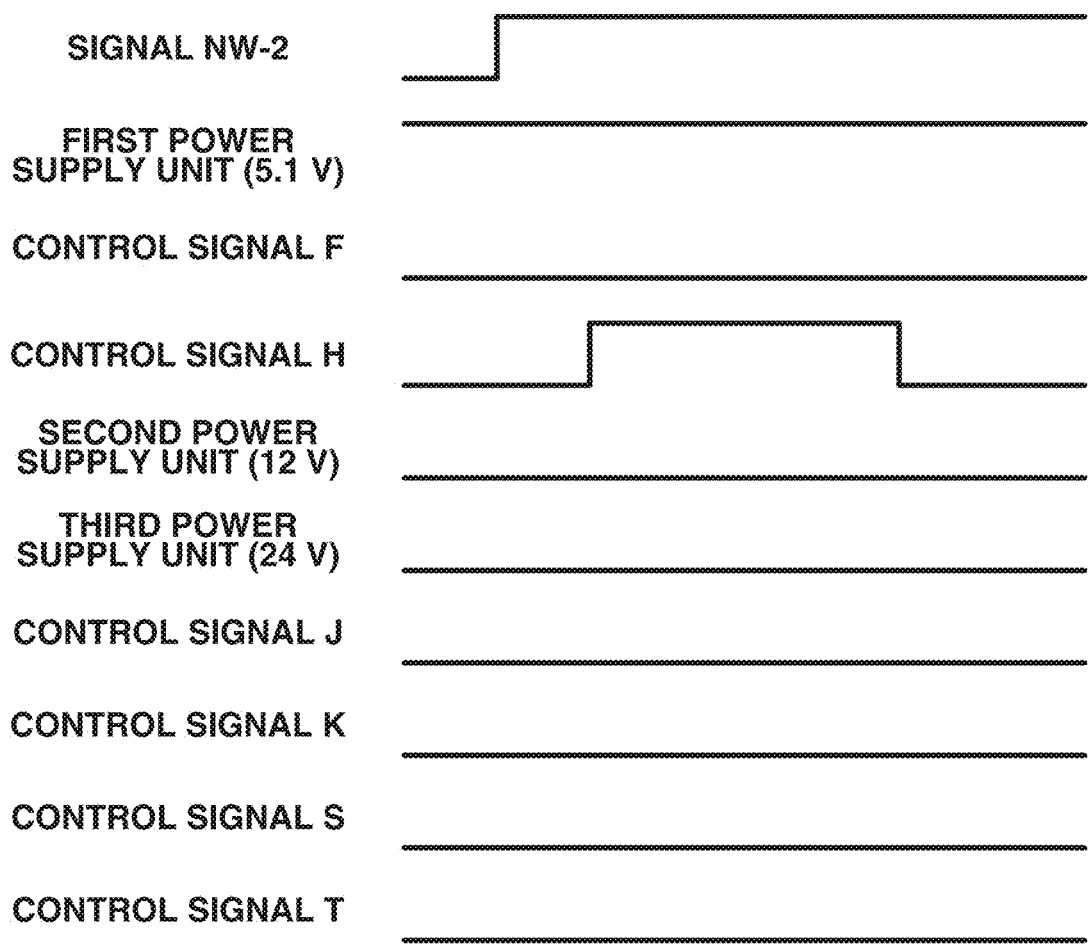

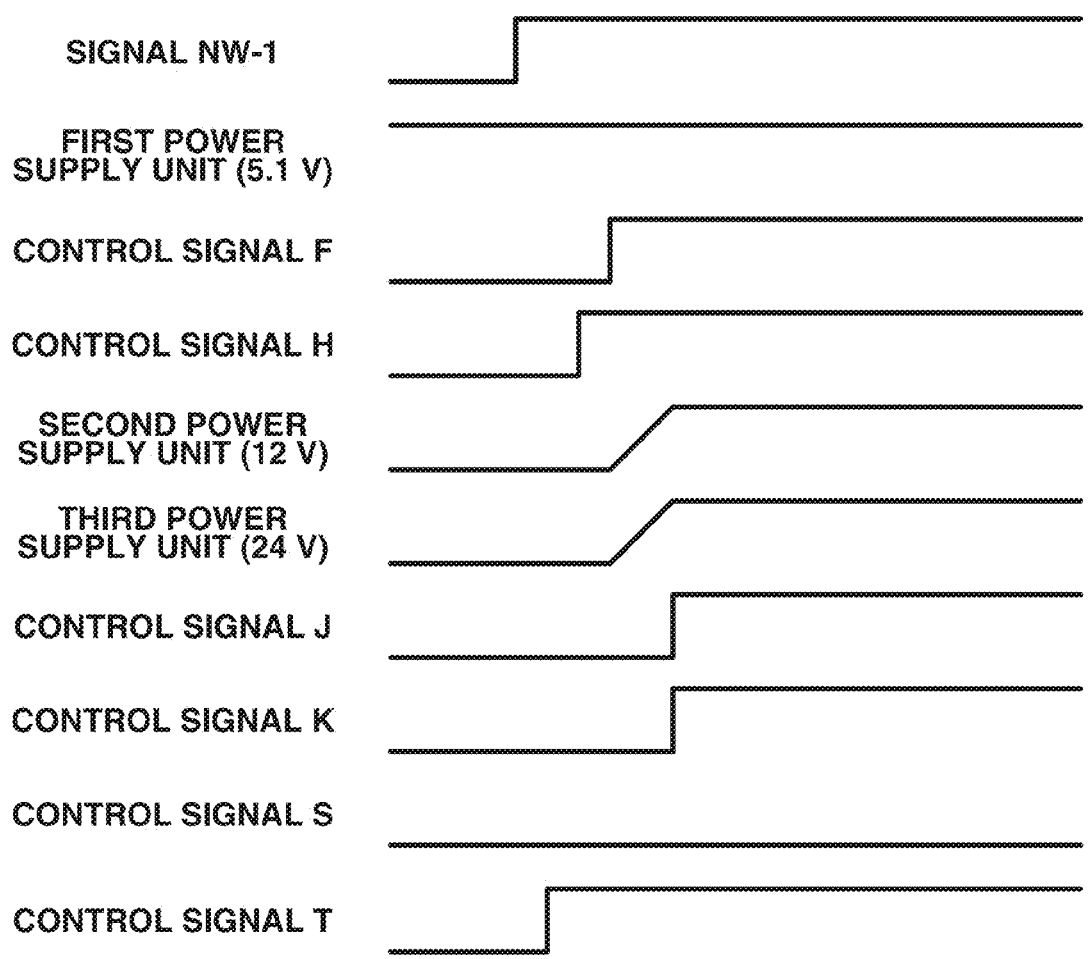

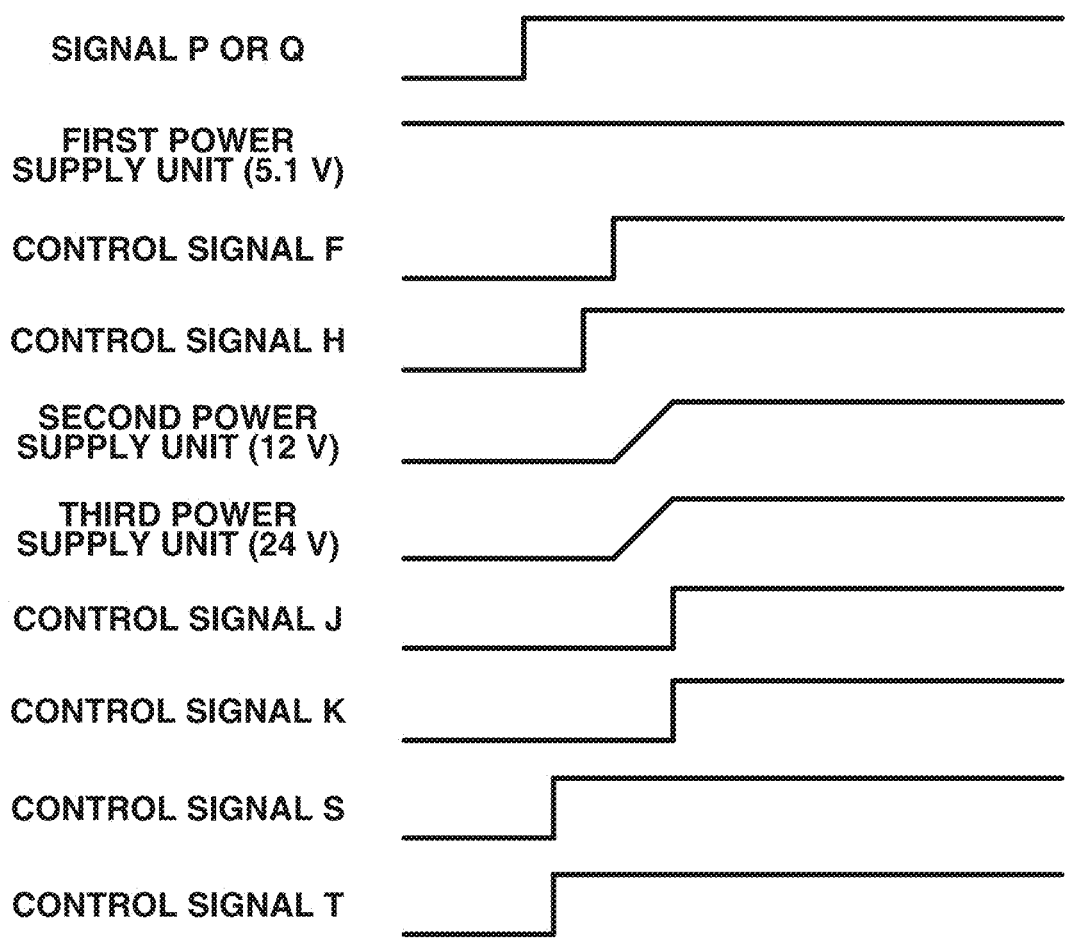

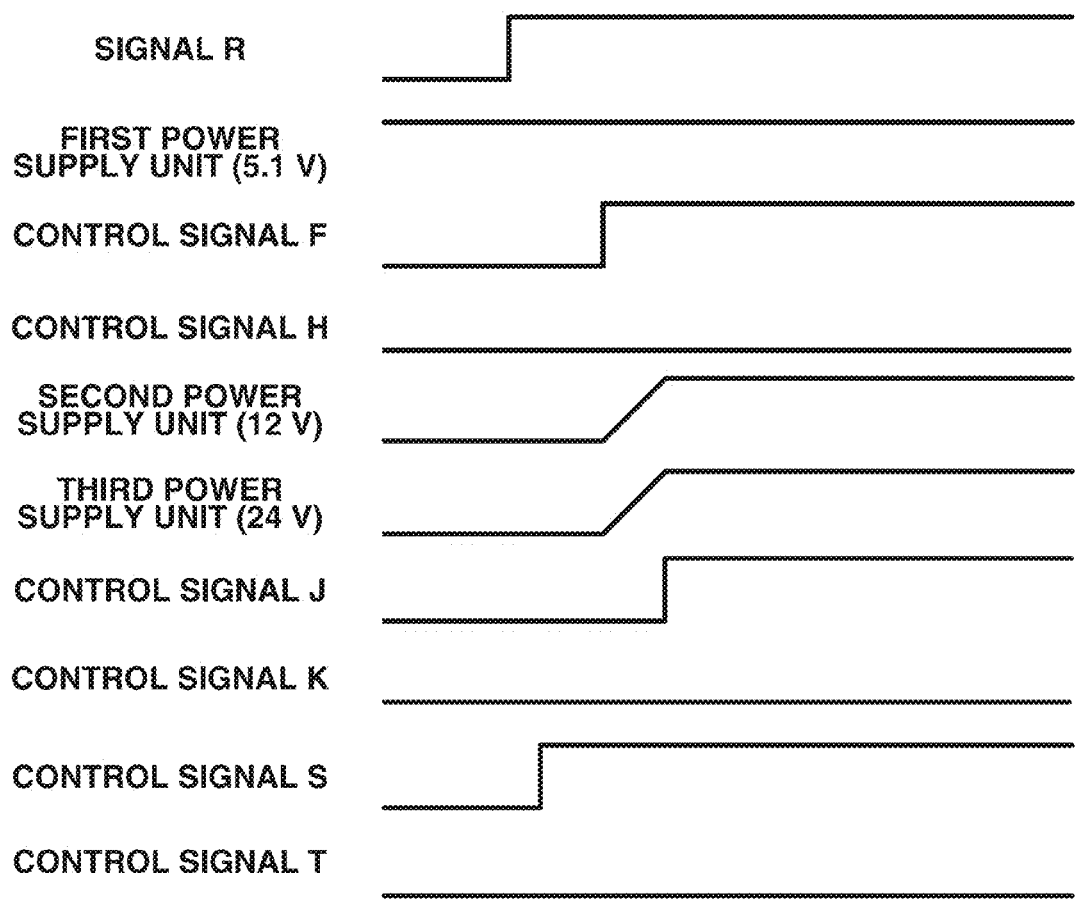

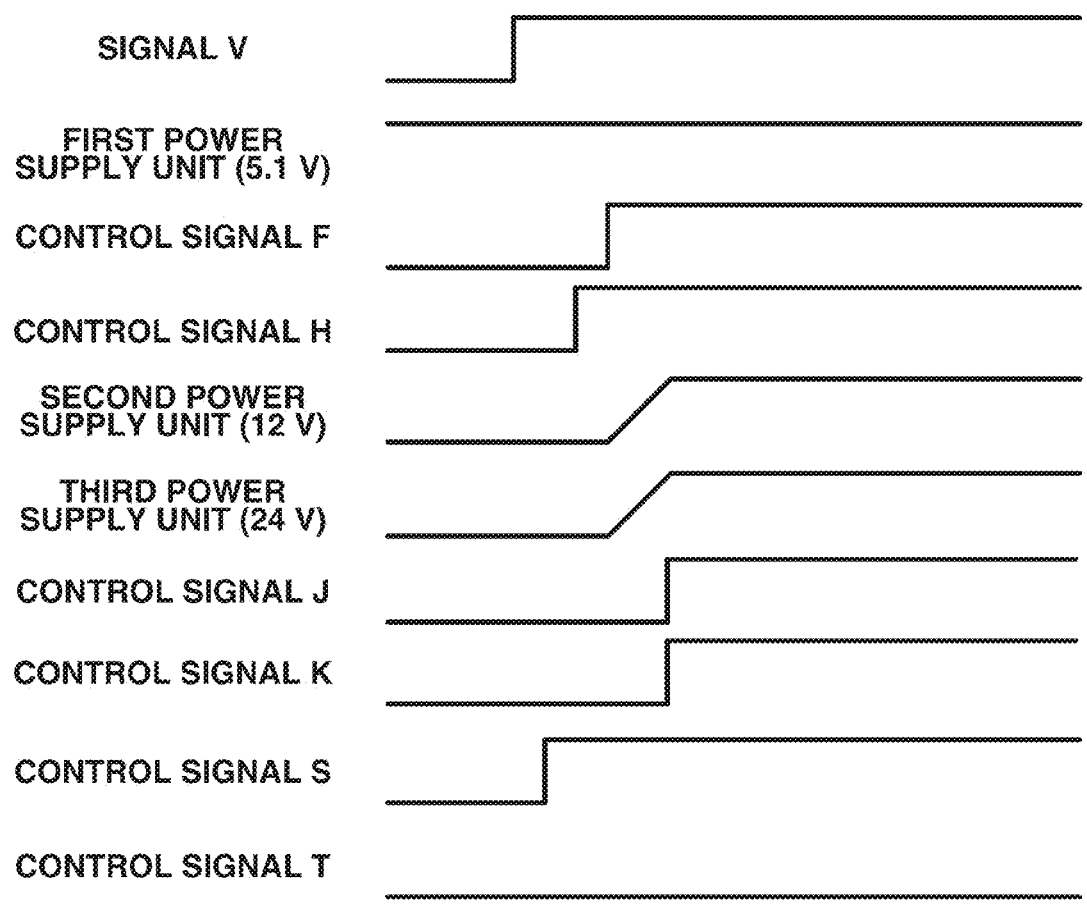

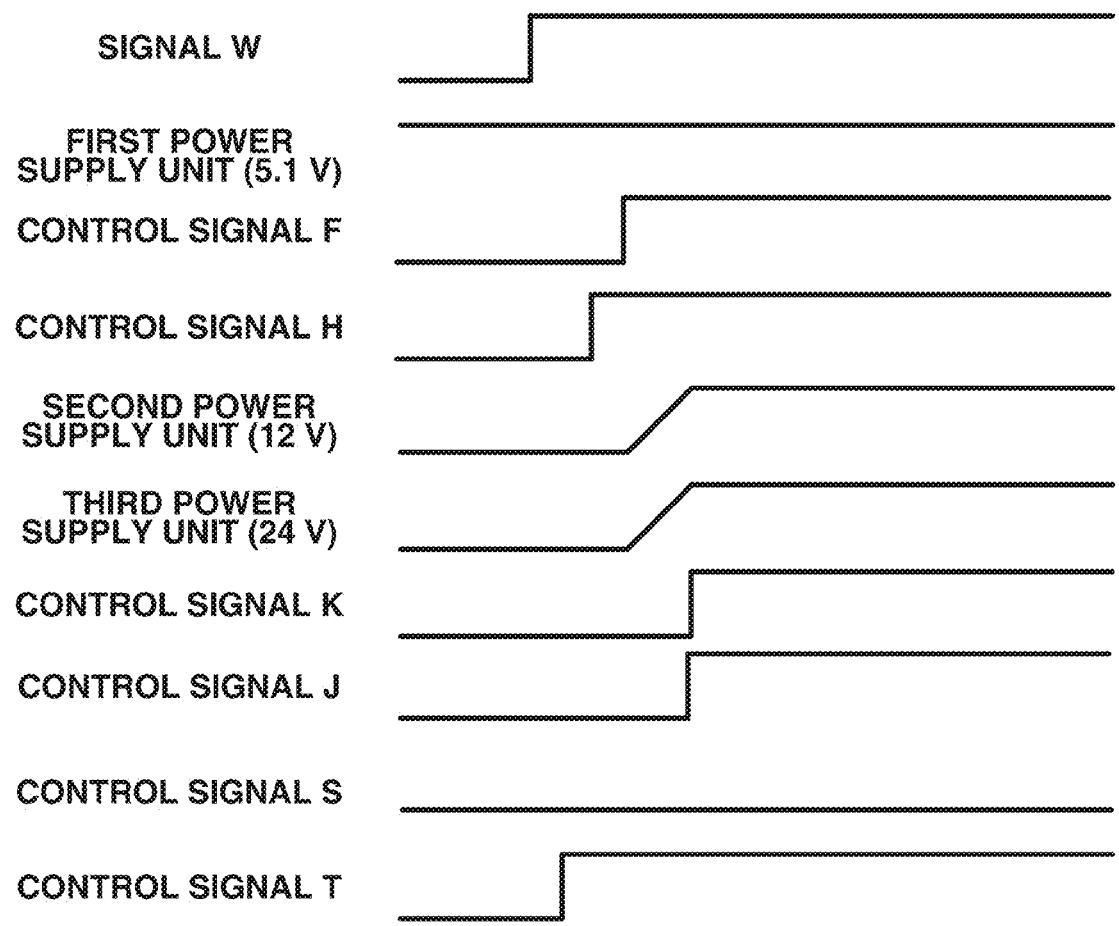

RETURN PROCESSING OF PRINTER UNIT

RETURN PROCESSING OF SCANNER UNIT

IMAGE FORMING APPARATUS AND CONTROLLING METHOD FOR THE SAME

CROSS-REFERENCE TO RELATED APPLICATIONS

This application is a continuation of U.S. application Ser. No. 14/532,997, which was filed on Nov. 4, 2014, and which claims priority to Japanese Patent Application No. 2013-231587, which was filed on Nov. 7, 2013, which are hereby incorporated by reference. U.S. application Ser. No. 14/532,997 issued on Feb. 2, 2016 as U.S. Pat. No. 9,253,354.

BACKGROUND OF THE INVENTION

Field of the Invention

The present invention relates to a technique for restoring an image forming apparatus from a power saving state.

Description of the Related Art

An image forming apparatus that can shift to a power saving state when print and scan functions are not being executed has been known. In the power saving state, power supply to a printer unit and a scanner unit (hereinafter, when appropriate, referred to for short as a printer unit and the like) for executing the functions is stopped. If the image forming apparatus is in the power saving state and a return factor is detected, power is supplied to the printer unit and the scanner unit. Examples of the return factor include pressing of a return button by a user.

Even if a return factor is detected, the printer unit and the like are not necessarily used. For example, when image data of a scanned document is stored into a memory of the image forming apparatus, power does not need to be supplied to the printer unit. In other words, if power is supplied to all the devices upon detecting a return factor, even unnecessary devices may be powered on.

A technique for performing control so that power is supplied to a device or devices that execute(s) the function to be used and not to a device or devices that execute(s) unused functions has been discussed in Japanese Patent Application Laid-Open No. 2002-359703.

An image forming apparatus discussed in Japanese Patent Application Laid-Open No. 2002-359703 determines which device(s) to supply power to according to a factor for canceling a power saving state. More specifically, according to Japanese Patent Application Laid-Open No. 2002-359703, if a print request signal is received from an external apparatus, power is supplied to a printer unit to perform printing, and not to a scanner unit. If a sensor detects that a document is placed on the scanner unit, power is supplied to the scanner unit and not to the printer unit.

According to Japanese Patent Application Laid-Open No. 2002-359703 described above, no power is supplied to the printer unit and the like unless the printer unit and the like are determined to be used. More specifically, when a return button arranged on an operation unit is pressed, it is not yet determined whether to use the print and/or scan function(s). No power is thus supplied to the printer unit and the like. When the print and/or scan function(s) is/are subsequently determined to be used, power is supplied to the device(s) needed to perform the function(s) (see paragraph 0038 of Japanese Patent Application Laid-Open No. 2002-359703). In other words, according to Japanese Patent Application Laid-Open No. 2002-359703, no power is supplied to the printer unit and the like until the print and/or scan function (s) is/are determined to be used. The user therefore needs to wait until the power to the printer unit and/or the scanner unit stabilizes, while the printer unit and/or the scanner unit is/are reset, and while a preparation operation of the printer unit and/or the scanner unit (driving of the driving systems (motors)) is performed.

On the other hand, suppose that the preparation operation of the printer unit and the like is performed before it is determined whether to use the print and/or scan function(s). In such a case, the preparation operation can consume useless power unless the printer unit and the like are used. There is another disadvantage that the preparation operation of the devices produces noise if the printer unit and the like are not used.

SUMMARY OF THE INVENTION

The present invention is directed to an image forming apparatus capable of preventing useless consumption of power and generation of noise by a preparation operation of a printer unit and the like when the image forming apparatus returns from a power saving state, and further capable of reducing time for the functions of the printer unit and the like to become usable when the printer unit and the like are determined to be used by supplying power to the printer unit and the like before the printer unit and the like are determined to be used.

According to an aspect of the present invention, an image forming apparatus includes an image forming unit configured to form an image on a sheet based on image data, a control unit configured to control driving of the image forming unit, and a power supply unit configured to, if a factor for shifting from a power saving state where power supply to the image forming unit and the control unit is stopped to a standby state where power is supplied to the image forming unit and the control unit is detected, supply power to the image forming unit and the control unit, wherein if a first type of factor is detected as the factor in the power saving state, the power supply unit supplies power to the control unit and the image forming unit, and the control unit restricts a preparation operation of the image forming unit, and wherein the control unit is configured to, if an instruction to perform a function of forming an image on a sheet is accepted, perform the preparation operation of the image forming unit.

Further features of the present invention will become apparent from the following description of exemplary embodiments with reference to the attached drawings.

BRIEF DESCRIPTION OF THE DRAWINGS

FIG. 6 is a table illustrating power supply states of devices in each power state.

FIG. 7 is a diagram illustrating a state of the image forming apparatus in a power off state.

FIG. 8 is a diagram illustrating a state of the image forming apparatus in a second sleep state.

FIG. 13 is a sequence diagram illustrating signals that a power supply control unit outputs when a packet to which no proxy response can be made is received.

FIG. 14 is a sequence diagram illustrating signals that the power supply control unit outputs when a job is received.

FIG. 15 is a sequence diagram illustrating signals that the power supply control unit outputs when a human body detection sensor detects a person or when a button of the operation unit is pressed.

FIG. 16 is a sequence diagram illustrating signals that the power supply control unit outputs when a timer has counted a predetermined time.

FIG. 17 is a sequence diagram illustrating signals that the power supply control unit outputs when a document detection sensor detects a document.

FIG. 18 is a sequence diagram illustrating signals that the power supply control unit outputs when a sheet is set on a manual feed tray.

DESCRIPTION OF THE EMBODIMENTS

Various exemplary embodiments, features, and aspects of the invention will be described in detail below with reference to the drawings.

<Overall Configuration of Image Forming Apparatus>

Figure 1:
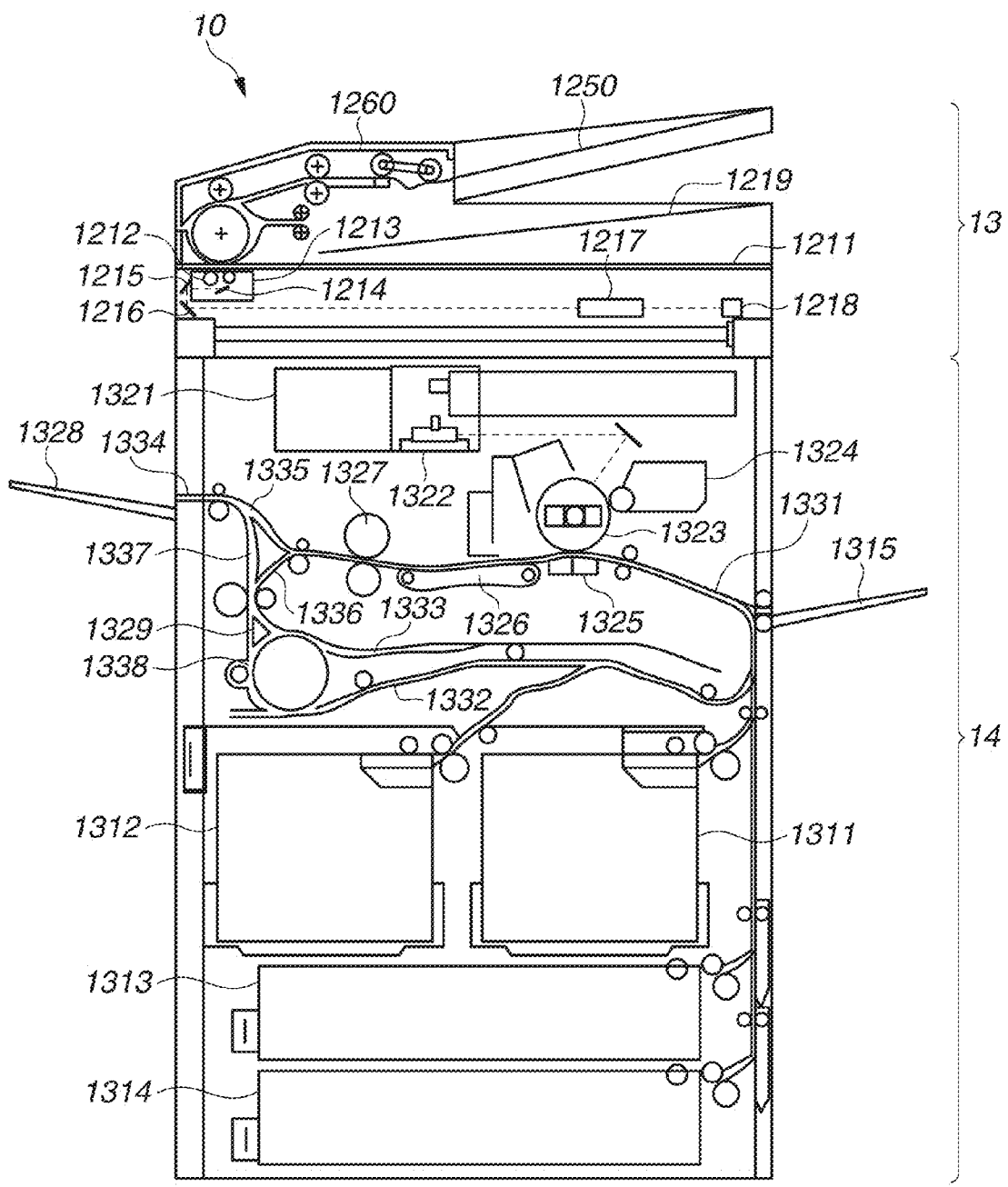
FIG. 1 is a diagram illustrating a structure of an image forming apparatus according to a first exemplary embodiment.

FIG. 1 is a diagram illustrating a structure of an image forming apparatus according to a first exemplary embodiment of the present invention.

As illustrated in FIG. 1, an image forming apparatus 10 includes a scanner unit 13 serving as an image input device and a printer unit 14 serving as an image output device.

The scanner unit 13 is a device for reading an image formed on a document to obtain image data. The scanner unit 13 irradiates the image formed on the document with light and inputs reflected light into a charge-coupled device (CCD) sensor to convert information about the image into an electrical signal. The electrical signal is converted into luminance signals of respective colors of red (R), green (G), and blue (B), and output to a controller 11 to be described below.

Documents set on a tray 1250 of the scanner unit 13 are fed to a reading position of an optical unit 1213 on a platen glass 1211 one by one by a document feeder 1260. The document read by the optical unit 1213 is discharged to a discharge tray 1219. Light emitted from the lamp 1212 of the optical unit 1213 and reflected by the document is input to a CCD image sensor 1218 via mirrors 1214, 1215, and 1216 and a lens 1217. Documents may be read by other methods than the automatic feeding method using the document feeder 1260. In one possible method, a carriage on which the optical unit 1213 is mounted may scan over a document placed on the platen glass 1211. The first exemplary embodiment deals with the image forming apparatus 10 that is capable of monochromatic printing, whereas the image forming apparatus 10 may be capable of color printing.

The printer unit 14 is a device for forming an image on a sheet by using input image data. The printer unit 14 according to the present exemplary embodiment is an electrophotographic printer unit using a photosensitive drum or a photosensitive belt. However, an exemplary embodiment of the present invention is not limited thereto. For example, the printer unit 14 may be an inkjet printer unit that performs printing on a sheet by discharging ink from a minute nozzle array.

The image forming apparatus 10 further includes a plurality of sheet cassettes 1311, 1312, 1313, and 1314, and a manual feed tray 1315. The plurality of sheet cassettes 1311, 1312, 1313, and 1314 store sheets for the printer unit 14 to form an image thereon. A laser driver 1321 of the printer unit 14 drives a laser emitting unit 1322. The laser driver 1321 causes the laser emitting unit 1322 to emit laser light according to image data output from the controller 11. A photosensitive drum 1323 is irradiated with the laser light, whereby a latent image according to the laser light is formed on the photosensitive drum 1323. A developing device 1324 applies a developer to the latent image portions of the photosensitive drum 1323. A transfer unit 1325 transfers the developer applied to the photosensitive drum 1323 to recording paper passed through a conveyance path 1331. The recording paper bearing the developer is conveyed to a fixing device 1327 by a conveyance belt 1326. The fixing device 1327 fixes the developer onto the recording paper by heat and pressure. The recording paper having passed through the fixing device 1327 passes through conveyance paths 1335 and 1334, and discharged to a sheet discharge tray 1328. If the recording paper is to be discharged to the sheet discharge tray 1328 with the printed side reversed, the recording paper is guided into conveyance paths 1336 and 1338 before passing through a conveyance path 1337 and the conveyance path 1334.

For two-sided printing, the recording paper is guided from the fixing device 1327 to the conveyance path 1336 and then guided by a flapper 1329 to a conveyance path 1333. The recording paper is then conveyed in a reverse direction and guided by the flapper 1329 to the conveyance path 1338 and a re-feed conveyance path 1332. The recording paper guided into the re-feed conveyance path 1332 passes through the conveyance path 1331, and fed to the transfer unit 1325.

<Details of Operation Unit>

Figure 2:
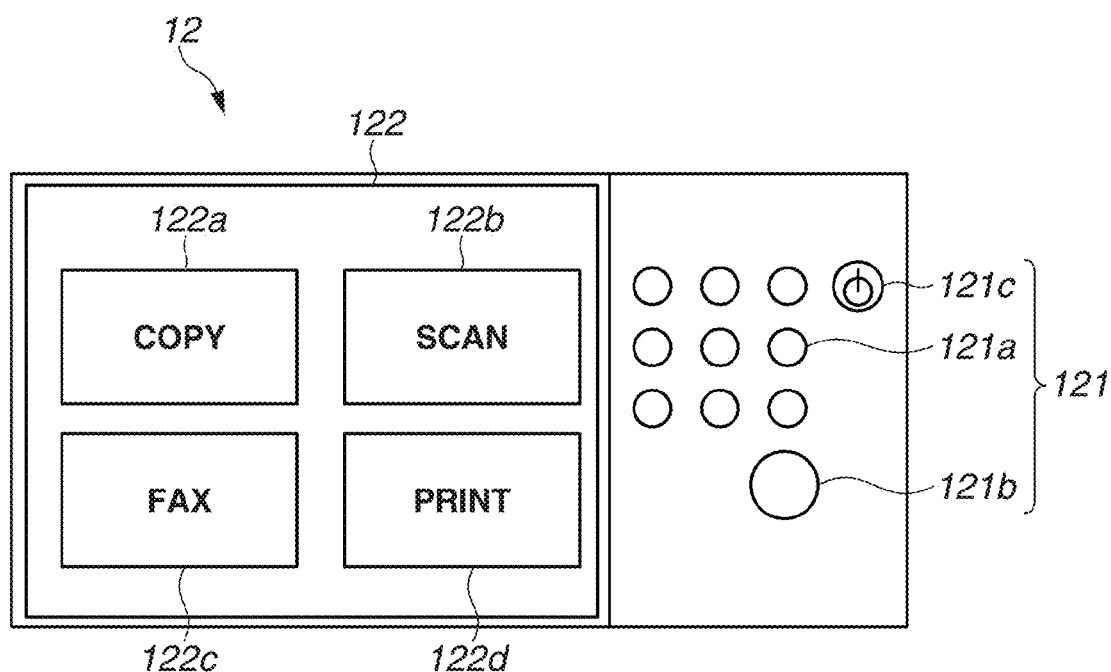
FIG. 2 is a diagram illustrating details of a display unit of the image forming apparatus.

FIG. 2 is a diagram illustrating details of an operation unit. The image forming apparatus 10 includes an operation unit 12. As illustrated in FIG. 2, the operation unit 12 includes various buttons 121 to be operated by the user, and a display unit 122 for displaying images. A touch panel is arranged on the surface of the display unit 122. The display unit 122 displays a status screen for displaying a status of the image forming apparatus 10, a selection screen for selecting a copy function and a facsimile (FAX) function, and a setting screen for inputting information needed to execute the function selected from the selection screen. On the display unit 122 illustrated in FIG. 2, the selection screen is displayed. The buttons 121 include buttons 121a for inputting the number of print copies, a start button 121b for starting copying or FAX transmission, and a power saving button 121c for shifting the image forming apparatus 10 into a power saving state (first sleep state to be described below).

When the image forming apparatus 10 is activated, the selection screen is displayed on the display unit 122. The selection screen includes a copy button 122a for executing the copy function, a scan button 122b for executing a scan function, a FAX button 122c for executing the FAX function, and a print button 122d for executing a print function.

<Description of Controller 11 of Image Forming Apparatus 10>

Figure 3:
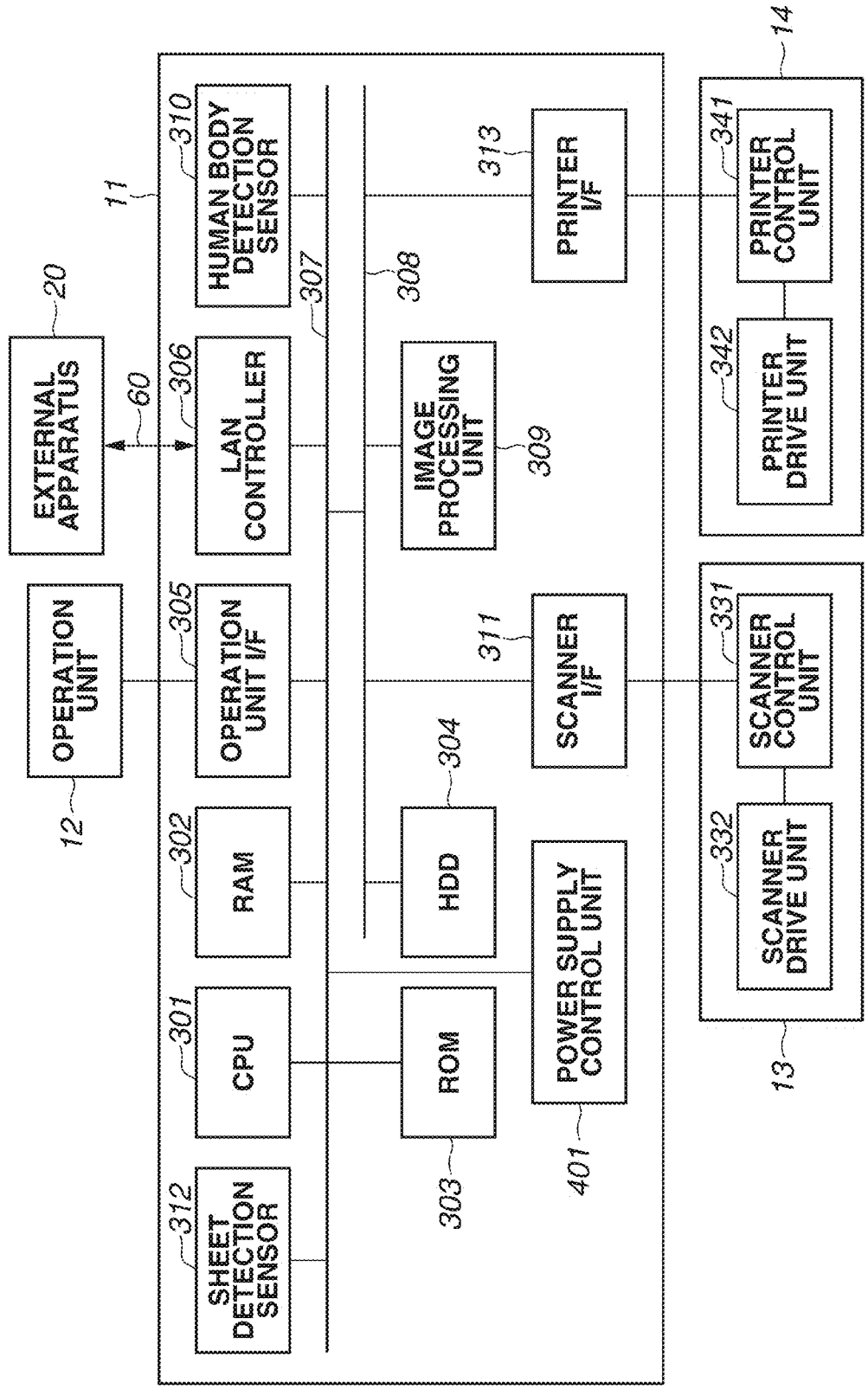
FIG. 3 is a block diagram illustrating a controller of the image forming apparatus.

FIG. 3 is a block diagram illustrating the controller 11 that controls the entire image forming apparatus 10. The controller 11 that controls the overall operation of the image forming apparatus 10 will be described in detail with reference to FIG. 3.

As illustrated in FIG. 3, the controller 11 is electrically connected to the scanner unit 13, the printer unit 14, and the operation unit 12 described above. The controller 11 includes a central processing unit (CPU) 301, a random access memory (RAM) 302, a read-only memory (ROM) 303, an operation unit interface (I/F) 305, a local area network (LAN) controller 306, a human body detection sensor 310, a sheet detection sensor 312, and a power supply control unit 401. The CPU 301, the RAM 302, the ROM 303, the operation unit I/F 305, the LAN controller 306, the human body detection sensor 310, the sheet detection sensor 312, and the power supply control unit 401 are connected to a system bus 307. The controller 11 further includes a hard disk drive (HDD) 304, an image processing unit 309, a scanner I/F 311, and a printer I/F 313. The HDD 304, the image processing unit 309, the scanner I/F 311, and the printer I/F 313 are connected to an image bus 308.

The CPU 301 controls access to various connected devices in a comprehensive manner based on a control program stored in the ROM 303. The CPU 301 also controls various types of processing executed by the controller 11 in a comprehensive manner.

The RAM 302 is a system work memory for the CPU 301 to operate with. The RAM 302 also serves as a memory for temporarily storing image data. The RAM 302 includes a static random access memory (SRAM) which can retain stored contents even when powered off, and a dynamic random access memory (DRAM) in which stored data is erased when powered off. The ROM 303 stores a boot program of the image forming apparatus 10. The HDD 304 stores a program for controlling the image forming apparatus 10 and image data.

The operation unit I/F 305 is an interface unit for connecting the system bus 307 and the operation unit 12. The operation unit I/F 305 receives image data to be displayed on the operation unit 12 from the system bus 307, and outputs the image data to the operation unit 12. The operation unit I/F 305 outputs information input from the operation unit 12 to the system bus 307.

The LAN controller 306 controls input and output of information between the image forming apparatus 10 and an external apparatus 20 connected to a network 60.

The human body detection sensor 310 is an infrared sensor array in which infrared sensors for receiving infrared rays are arranged in a matrix manner. The human body detection sensor 310 detects the approach of a person to the image forming apparatus 10 by receiving infrared rays radiated from the person. While the present exemplary embodiment deals with an example where the human body detection sensor 310 detects a person, the human body detection sensor 310 can detect any object that radiates infrared rays. Note that the human body detection sensor 310 is not limited to the infrared sensor. Sensors other than an infrared sensor may be used as long as the sensors can detect the approach of an object to the image forming apparatus 10. Examples of sensors include an optical sensor which detects light, a distortion sensor which deforms under physical force, a magnetic sensor which detects magnetism, and a temperature sensor which detects temperature.

The sheet detection sensor 312 detects that a sheet is set on the manual feed tray 1315.

The power supply control unit 401 controls power supply to the components in the image forming apparatus 10. The power supply control unit 401 will be described in detail below.

The image bus 308 is a transmission path for exchanging image data. Examples of the image bus 308 include a peripheral component interface (PCI) bus and an Institute of Electrical and Electronics Engineers (IEEE) 1394 bus.

The image processing unit 309 is for image processing. The image processing unit 309 reads image data stored in the RAM 302 and performs image processing. Examples of the image processing include enlargement and reduction of Joint Photographic Expert Group (JPEG) and Joint Bi-level Image Experts Group (JBIG) images, and color adjustment.

The scanner unit 13 includes a scanner control unit 331 and a scanner drive unit 332. The scanner drive unit 332 is a physically-driving device that includes a paper conveying motor for conveying a document set on the tray 1250 to the reading position of the scanner unit 13. The scanner control unit 331 controls an operation of the scanner drive unit 332. The scanner control unit 331 receives setting information through communication with the CPU 301 and controls the operation of the scanner drive unit 332 based on the setting information. The setting information is set by the user when performing scanner processing.

The printer unit 14 includes a printer control unit 341 and a printer drive unit 342. The printer drive unit 342 is a physically-driving device that includes a motor for rotating the photosensitive drum 1323, a motor for rotating the fixing device 1327, and a paper conveyance motor. The printer control unit 341 controls an operation of the printer drive unit 342. The printer control unit 341 receives setting information through communication with the CPU 301 and controls the operation of the printer drive unit 342 based on the setting information. The setting information is set by the user when performing print processing.

<Description of Power Unit 40 of Image Forming Apparatus 10>

Figure 4:
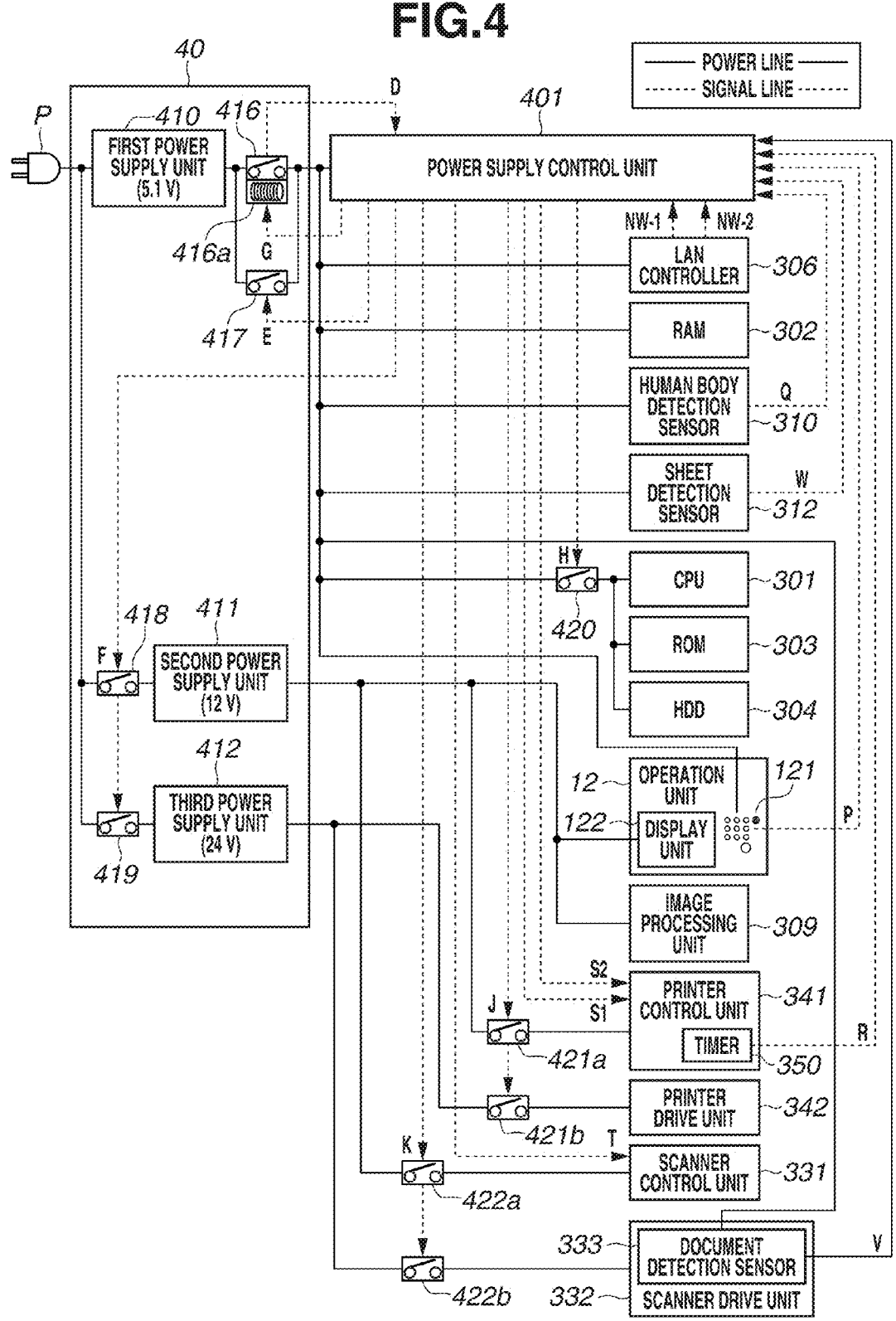
FIG. 4 is a power supply circuit diagram of the image forming apparatus.

FIG. 4 is a power supply circuit diagram of the image forming apparatus 10. Power generated by the power unit 40 is supplied to the components of the image forming apparatus 10 described above. The power unit 40 includes a first power supply unit 410, a second power supply unit 411, and a third power supply unit 412.

The first power supply unit 410 converts alternative-current power supplied through a plug P into direct-current power (e.g., 5.1 V (first output power)). The direct-current power is supplied to devices of a first power supply system (the power supply control unit 401, the CPU 301, the RAM 302, the ROM 303, the HDD 304, the LAN controller 306, the human body detection sensor 310, the sheet detection sensor 312, and the buttons 121 of the operation unit 12). In the present exemplary embodiment, the CPU 301 operates only with the power supplied from the first power supply unit 410, without receiving power supply from the second power supply unit 411 or the third power supply unit 412. In other words, the power supply of the CPU 301 is independent from the second power supply unit 411 and the third power supply unit 412. The second power supply unit 411 converts the alternating-current power supplied through the plug P into direct-current power (e.g., 12 V (second output power)). This direct-current power is supplied to devices of a second power supply system (the display unit 122 of the operation unit 12, the image processing unit 309, the printer control unit 341 of the printer unit 14, and the scanner control unit 331 of the scanner unit 13). The third power supply unit 412 converts the alternating-current power supplied through the plug P into direct-current power (e.g., 24 V), and supplies the direct-current power to devices of a third power supply system (the printer drive unit 342 and the scanner drive unit 332).

A power switch 416 is arranged between the first power supply unit 410 and the devices of the first power supply system. The power switch 416 becomes an ON state or an OFF state according to the user's operation. A signal D indicating the state of the power switch 416 (ON state or OFF state) is input to the power supply control unit 401. The power unit 40 further includes a switch 417, which is constituted with a field effect transistor (FET), arranged in parallel with the power switch 416. The switch 417 changes from an ON state to an OFF state or from the OFF state to the ON state according to a control signal E output from the power supply control unit 401. The power switch 416 includes a solenoid 416a. A voltage is applied to the solenoid 416a according to a control signal G output from the power supply control unit 401, whereby the power switch 416 is changed to the OFF state. When an automatic shutdown function or a remote shutdown function of the image forming apparatus 10 is executed, the power supply control unit 401 outputs the control signal G to drive the solenoid 416a to turn off the power switch 416. The automatic shutdown function is a function of shutting down the image forming apparatus 10 if a predetermined time elapses in a second sleep state to be described below without a user's operation. The remote shutdown function is a function of shutting down the image forming apparatus 10 according to a shutdown instruction transmitted from the external apparatus 20.

A relay switch 418 is arranged between the plug P and the second power supply unit 411. A relay switch 419 is arranged between the plug P and the third power supply unit 412. The relay switches 418 and 419 change from an ON state to an OFF state or from the OFF state to the ON state according to a control signal F output from the power supply control unit 401.

A switch 420 is arranged between the power switch 416 and the CPU 301, ROM 303, and HDD 304. The switch 420 changes from an ON state to an OFF state or from the OFF state to the ON state according to a control signal H output from the power supply control unit 401.

A switch 421a is arranged between the second power supply unit 411 and the printer control unit 341. A switch 421b is arranged between the third power supply unit 412 and the printer drive unit 342. The switches 421a and 421b change from an ON state to an OFF state or from the OFF state to the ON state according to a control signal J output from the power supply control unit 401.

A switch 422a is arranged between the second power supply unit 411 and the scanner control unit 331. A switch 422b is arranged between the third power supply unit 412 and the scanner drive unit 332. The switches 422a and 422b change from an ON state to an OFF state or from the OFF state to the ON state according to a control signal K output from the power supply control unit 401.

<About Power States of Image Forming Apparatus 10>

Figure 5:
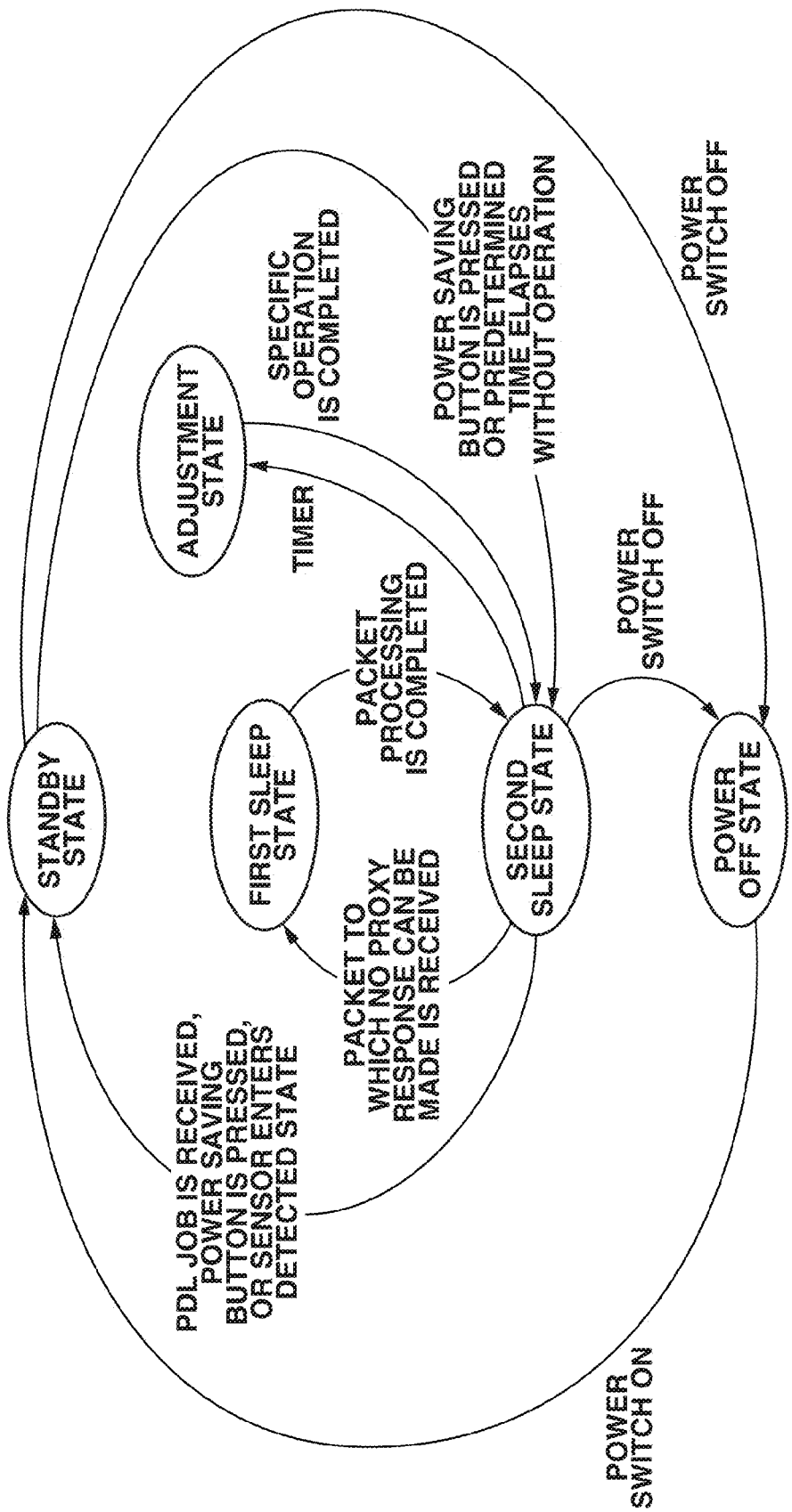
FIG. 5 is a power state transition diagram of the image forming apparatus.

FIG. 5 is a power state transition diagram of the image forming apparatus 10.

As illustrated in FIG. 5, the image forming apparatus 10 takes any one of a power off state, the second sleep state, the first sleep state, a standby state, and an adjustment state. The image forming apparatus 10 may take other states than those described above.

If the user changes the power switch 416 to the OFF state, the image forming apparatus 10 shifts to the power off state.

In the power off state, if the user changes the power switch 416 to the ON state, the image forming apparatus 10 shifts to the standby state.

If the user presses the power saving button 121c in the standby state, the image forming apparatus 10 shifts to the second sleep state. If a predetermined time elapses in the standby state without the operation unit 12 (the touch panel and the buttons 121) being operated, the image forming apparatus 10 shifts to the second sleep state.

In the present exemplary embodiment, if the image forming apparatus 10 receives a page description language (PDL) job (print request) or if the user presses the power saving button 121c in the second sleep state, the image forming apparatus 10 shifts to the standby state. In the second sleep state, if the human body detection sensor 310, the sheet detection sensor 312, or a document detection sensor 333 (see FIG. 4) included in the scanner unit 13 enters a detection state (i.e., detects a corresponding object), the image forming apparatus 10 shifts to the standby state.

In the second sleep state, instead of the CPU 301 of the controller 11, the LAN controller 306 returns a response to a specific packet transmitted from the external apparatus 20. Such a function of the LAN controller 306 will be referred to as a proxy response. The proxy response of the LAN controller 306 enables the image forming apparatus 10 to respond to the specific packet transmitted from the external apparatus 20 while remaining in the second sleep state.

In the second sleep state, if the LAN controller 306 receives a packet to which no proxy response can be made (except a PDL job) from the external apparatus 20, the image forming apparatus 10 shifts from the second sleep state to the first sleep state.

The image forming apparatus 10 having shifted to the first sleep state processes the packet to which no proxy response can be made. The image forming apparatus 10 then shifts to the second sleep state without waiting for the above-described predetermined time.

If a timer 350 (see FIG. 4) included in the printer control unit 341 has counted a predetermined time in the second sleep state, the image forming apparatus 10 shifts to the adjustment state. If the image forming apparatus 10 performs a specific operation (such as rotating the photosensitive drum 1323) in the adjustment state, the image forming apparatus 10 shifts to the second sleep state again.

FIG. 6 is a table summarizing power feed states of the devices in each power state of the image forming apparatus 10. FIGS. 7 to 11 are diagrams illustrating the state of the image forming apparatus 10 in the respective power states. More specifically, the gray color blocks in FIGS. 7 to 11 indicate the devices that no power is supplied thereto. The power states of the image forming apparatus 10 will be described with reference to FIGS. 6 to 11.

(1) Power Off State

The power off state refers to a state where, as illustrated in FIGS. 6 and 7, no power is supplied to the components of the image forming apparatus 10. In the power off state, as illustrated in FIG. 7, the switches 416 to 422 are in the OFF state. The power off state may be a hibernation state. A hibernation state refers to a state where the state of a computer immediately before power-off is stored in a nonvolatile memory so that the computer, when powered on next time, can resume operations from the state immediately before the power-off. In the hibernation state, the switches 416 to 422 are in the OFF state as with the case of the power off state. In the hibernation state, the state of the image forming apparatus 10 immediately before shifting to the hibernation state is stored in the HDD 304. When returning from the hibernation state, the image forming apparatus 10 can return quickly by using the information stored in the HDD 304. While the power off state has been described to be a state where the power supply to the components of the image forming apparatus 10 is stopped, the power off state is not limited to such a state that the power supply to all the portions of the image forming apparatus 10 is stopped. For example, the power off state may include a suspend state where the power supply to the RAM 302 is maintained. A suspend state refers to a state where the state of a computer immediately before power-off is stored in a volatile memory (e.g., the RAM 302) so that the computer, when powered on next time, can resume operations from the state immediately before the power-off. The timer 350 is configured to be driven by a battery. The timer 350 is driven even in the power off state.

(2) Second Sleep State

In the second sleep state, as illustrated in FIGS. 6 and 8, power is supplied to the power supply control unit 401, the RAM 302, the LAN controller 306, the human body detection sensor 310, the sheet detection sensor 312, the document detection sensor 333, and the buttons 121 of the operation unit 12. Note that the devices to which the power is supplied in the second sleep state are just an example. In the second sleep state, no power is supplied to the CPU 301, the ROM 303, the HDD 304, the image processing unit 309, the scanner unit 13, and the printer unit 14. In the second sleep state, the first power supply unit 410 supplies power to the devices of the first power supply system (the power supply control unit 401, the RAM 302, the LAN controller 306, the human body detection sensor 310, the sheet detection sensor 312, the document detection sensor 333, and the buttons 121). In the second sleep state, as illustrated in FIG. 8, the switches 416 and 417 are in the ON state. The other switches 418 to 422 are in the OFF state. In the second sleep state, the user's operation on the buttons 121 of the operation unit 12 can be accepted. In the second sleep state, the LAN controller 306 can receive a packet transmitted from the external apparatus 20. In the second sleep state, the human body detection sensor 310 can detect the approach of a person to the image forming apparatus 10. In the second sleep state, the sheet detection sensor 312 can detect that a sheet is set on the manual feed tray 1315. In the second sleep state, the document detection sensor 333 can detect that a document is set on the tray 1250.

(3) First Sleep State

Figure 9:
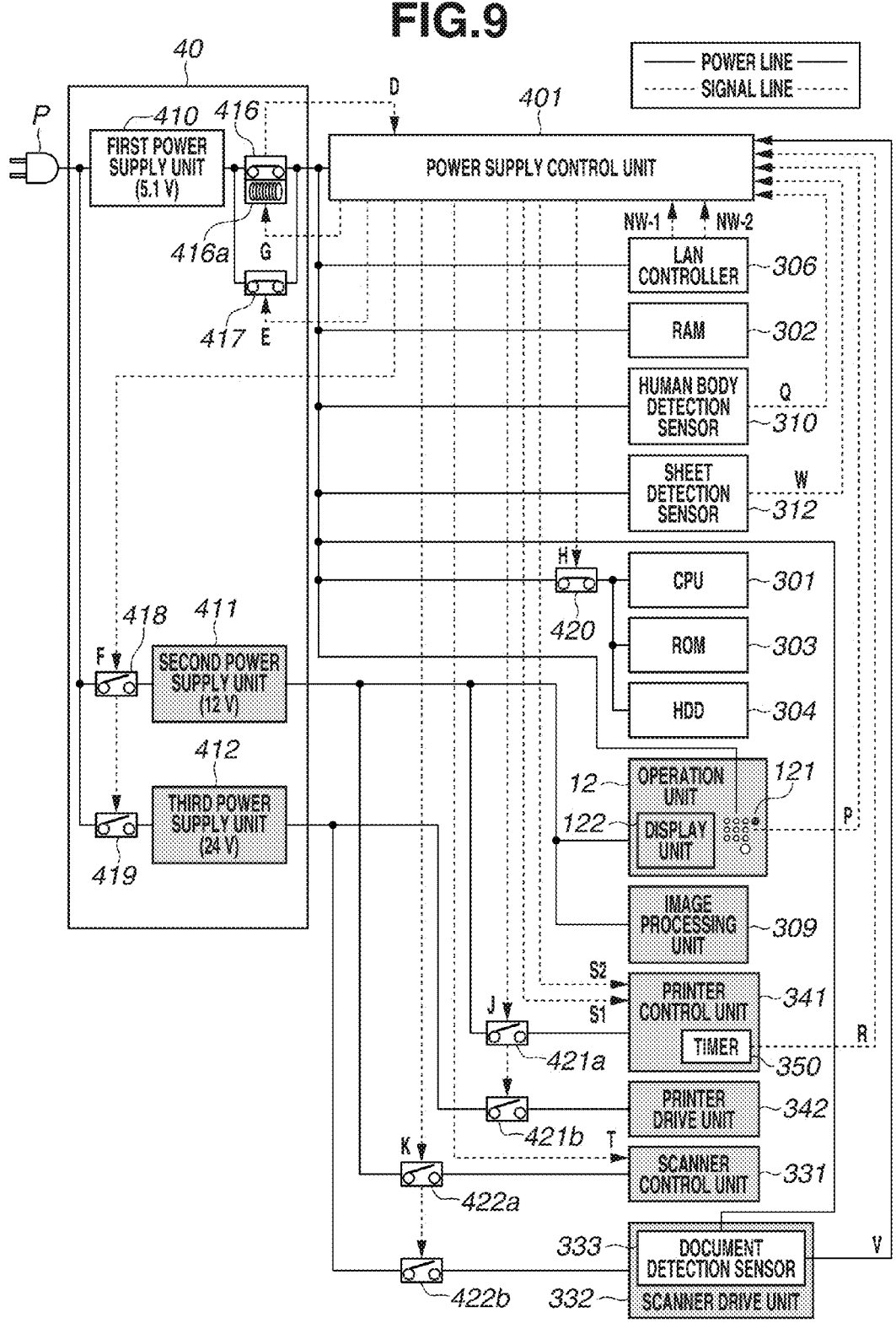
FIG. 9 is a diagram illustrating the state of the image forming apparatus in a first sleep state.

The first sleep state is a state for responding to an inquiry from the network 60 without activating the entire controller 11. In the first sleep state, the first power supply unit 410 supplies power to at least the CPU 301 and the HDD 304. As a result, the CPU 301 can return a response to a packet to which no proxy response can be made, received by the LAN controller 306, by using information stored in the HDD 304. In the first sleep state, as illustrated in FIGS. 6 and 9, power is supplied to the power supply control unit 401, the RAM 302, the LAN controller 306, the buttons 121, the CPU 301, and the ROM 303. In the first sleep state, power is also supplied to the human body detection sensor 310, the sheet detection sensor 312, the document detection sensor 333, and the HDD 304. In the first sleep state, no power is supplied to the devices of the second and third power supply systems. In the first sleep state, as illustrated in FIG. 9, the switches 416, 417, and 420 are in the ON state. The switches 418, 419, 421*a*, 421*b*, 422*a* and 422*b* are in the OFF state. Note that the devices to which the power is supplied in the first sleep state are just an example.

(4) Adjustment State

Figure 10:
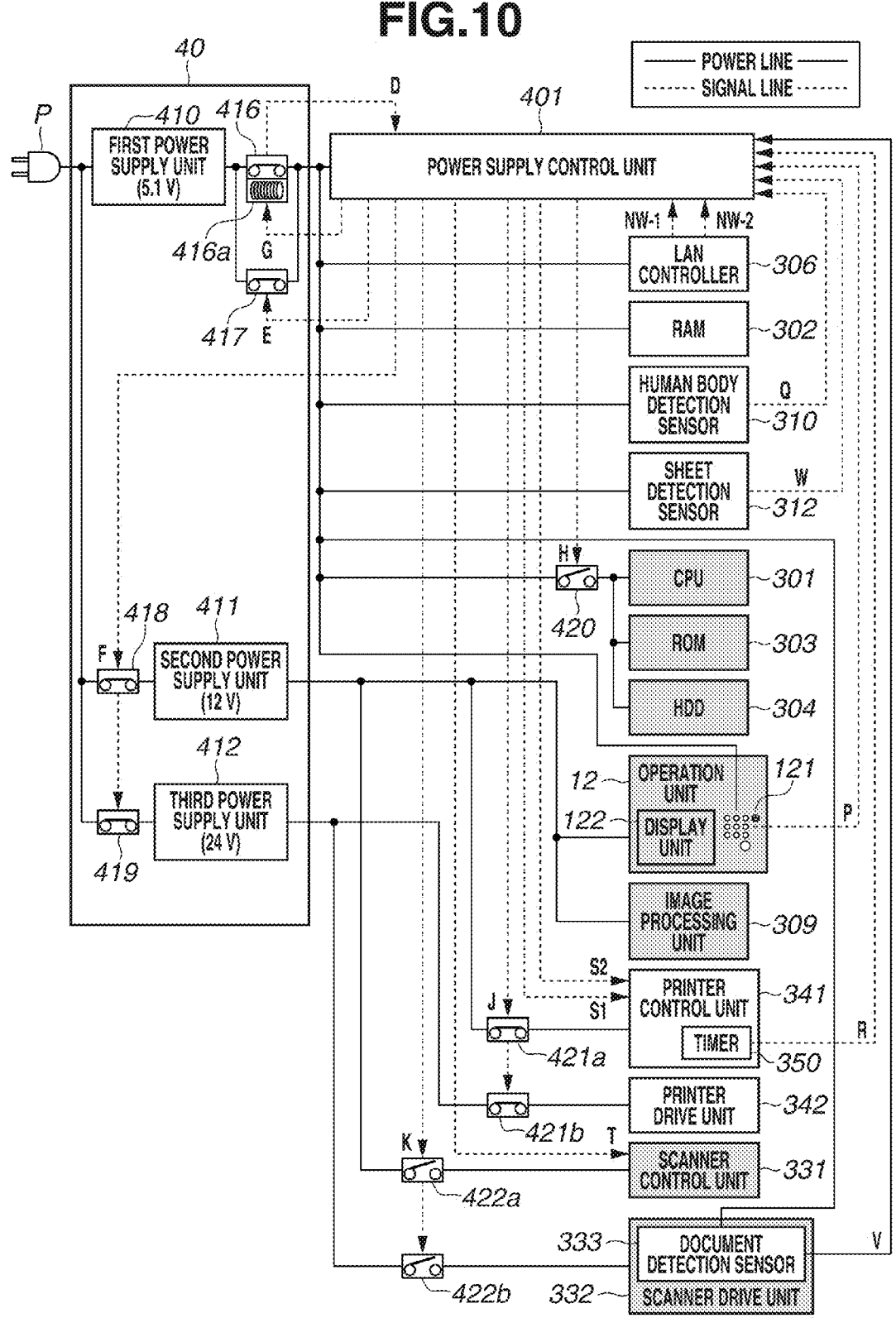
FIG. 10 is a diagram illustrating a state of the image forming apparatus in a standby state (i.e., the printer unit and the scanner unit are in a normal mode).

The adjustment state is a state to which the image forming apparatus 10 shifts to prevent the photosensitive drum 1323 and a blade for scraping toner off the photosensitive drum 1323 from contacting with each other at the same position for a long time. If the image forming apparatus 10 shifts to the adjustment state, the photosensitive drum 1323 rotates to change the relative position between the photosensitive drum 1323 and the blade. In the adjustment state, as illustrated in FIGS. 6 and 10, power is supplied to the printer control unit 341 and the printer drive unit 342, and not to the CPU 301 or the HDD 304. In the adjustment state, as illustrated in FIG. 10, the switches 416, 417, 418, 419, 421*a* and 421*b* are in the ON state. The switches 420, 422*a* and 422*b* are in the OFF state.

(5) Standby State

Figure 11:
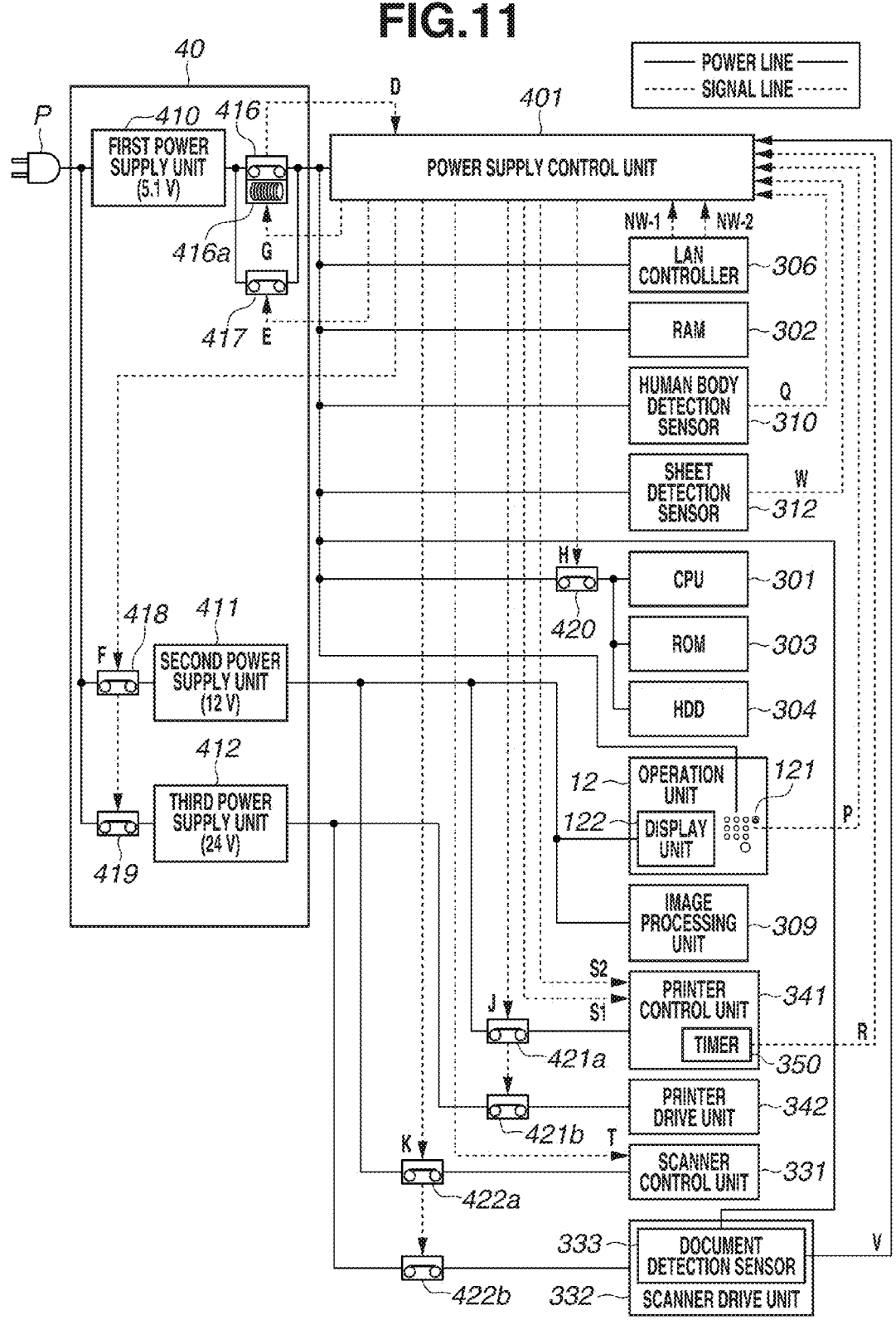
FIG. 11 is a diagram illustrating a state of the image forming apparatus in an adjustment state.

In the standby state, as illustrated in FIGS. 6 and 11, power is supplied to the components of the controller 11, the operation unit 12, the printer unit 14, and the scanner unit 13. More specifically, in the standby state, the switches 416 to 422 of FIG. 11 are in the ON state.

Now, the power supply control unit 401 will be described in detail.

The power supply control unit 401 is a complex programmable logic device (CPLD). The power supply control unit 401 controls the shift of the image forming apparatus 10 to each of the above-described power states. The power supply control unit 401 is supplied with power in the second sleep state, and detects a plurality of types of return factors from the second sleep state. As illustrated in FIG. 4, the power supply control unit 401 receives signals NW-1 and NW-2 as return factors from the LAN controller 306. The signal NW-1 is output to the power supply control unit 401 when the LAN controller 306 receives a PDL job. The signal NW-2 is output to the power supply control unit 401 when the LAN controller 306 receives a packet to which no proxy response can be made. The power supply control unit 401 further receives a signal P as a return factor from the buttons 121 of the operation unit 12. The signal P is output to the power supply control unit 401 when the buttons 121 are operated by the user. The power supply control unit 401 further receives a signal Q as a return factor from the human body detection sensor 310. The signal Q is output to the power supply control unit 401 when the human body detection sensor 310 detects a person approaching the image forming apparatus 10. The power supply control unit 401 further receives a signal R as a return factor from the timer 350. The signal R is output to the power supply control unit 401 when the timer 350 has counted a set time. The time is set in the timer 350 by the CPU 301 before the image forming apparatus 10 shifts to the second sleep state. The power supply control unit 401 further receives a signal V as a return factor from the document detection sensor 333. The signal V is output to the power supply control unit 401 when the document detection sensor 333 detects a document. The power supply control unit 401 further receives a signal W as a return factor from the sheet detection sensor 312 which is arranged on the manual feed tray 1315. The signal W is output to the power supply control unit 401 when a sheet is set on the manual feed tray 1315.

The power supply control unit 401 changes the states of the switches 417 to 422 to the ON state or the OFF state based on the logic of the above-described return factors (signals NW-1, NW-2, P, Q, R, V, and W).

If the signal NW-1 is input to the power supply control unit 401, the power supply control unit 401 serving as a signal output unit outputs the control signals E, F, K, J, and H (changes the signal levels to "high"). As a result, the image forming apparatus 10 shifts to the standby state. If the signal NW-1 is input to the power supply control unit 401, the power supply control unit 401 does not output a control signal S1 or T (changes the signal levels to "low").

If the signal P, Q, V, or W is input to the power supply control unit 401, the power supply control unit 401 similarly outputs the control signals E, F, K, J, and H (changes the signal levels to "high"), and the image forming apparatus 10 shifts to the standby state. If the signal P or Q is input to the power supply control unit 401, the power supply control unit 401 further outputs the control signals S1 and T (changes the signal levels to "high"). If the signal V is input to the power supply control unit 401, the power supply control unit 401 further outputs the control signal S1 (changes the signal level to "high") and does not output the control signal T (changes the signal level to "low"). If the signal W is input to the power supply control unit 401, the power supply control unit 401 further outputs the control signal T (changes the signal level to "high") and does not output the control signal S1 (changes the signal level to "low").

If the signal NW-2 is input to the power supply control unit 401, the power supply control unit 401 outputs the control signals E and H (changes the signal levels to "high"). As a result, the image forming apparatus 10 shifts to the first sleep state.

If the signal R is input to the power supply control unit 401, the power supply control unit 401 outputs the control signals F and J (changes the signal levels to "high"). As a result, the image forming apparatus 10 shifts to the adjustment state. If the signal R is input to the power supply control unit 401, the power supply control unit 401 outputs a control signal S2 (changes the signal level to "high").

The signal D indicating the state of the power switch 416 is also input to the power supply control unit 401. The signal D is input to the power supply control unit 401 if the power switch 416 is changed to the OFF state by the user's operation. If the signal D is input to the power supply control unit 401, the power supply control unit 401 outputs the control signals E, F, H, J, K and G (changes the signal levels to "low"). As a result, the image forming apparatus 10 shifts to the power off state.

<Processing for Returning from Second Sleep State>

Figure 12:
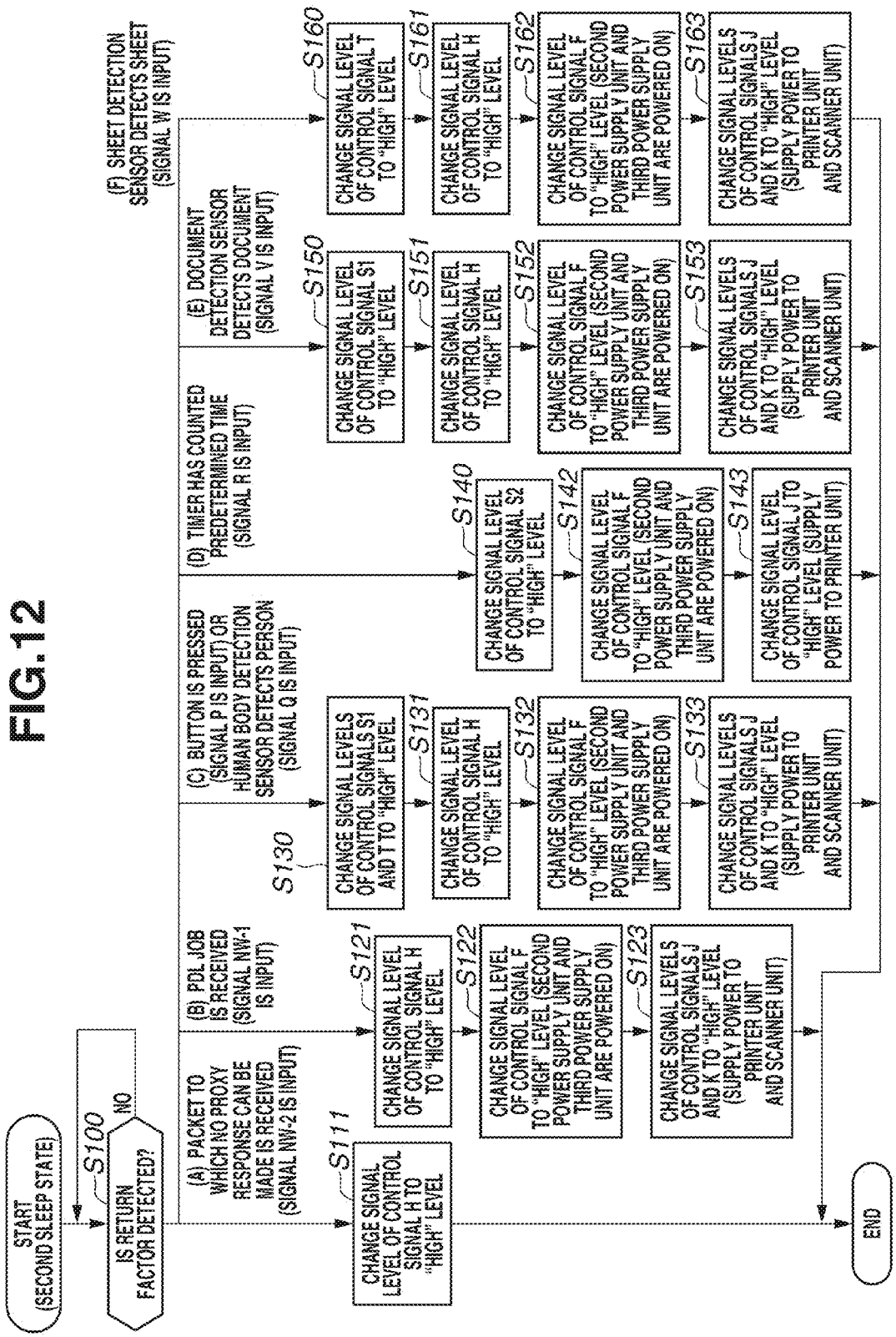
FIG. 12 is a flowchart illustrating processing by which the image forming apparatus returns from the second sleep state.

FIG. 12 is a flowchart illustrating processing by which the image forming apparatus 10 returns from the second sleep state. FIGS. 13 to 18 are sequence diagrams of the signals input to the power supply control unit 401 and the signals output from the power supply control unit 401. Signal processing performed by the power supply control unit 401 when the image forming apparatus 10 returns from the second sleep state will be described with reference to FIGS. 12 to 18.

In step S100, the power supply control unit 401 detects any one of the signals NW-1, NW-2, P, Q, R, V, and W as a return factor.

(A) If Packet to which No Proxy Response can be Made is Received

As illustrated in FIGS. 12 and 13, if the LAN controller 306 receives a packet to which no proxy response can be made, the LAN controller 306 inputs the signal NW-2 to the power supply control unit 401 (the signal NW-2 becomes a "high" level). If the signal NW-2 becomes the "high" level, then in step S111, the power supply control unit 401 changes the signal level of the control signal H to "high". This changes the switch 420 to the ON state, and the first power supply unit 410 supplies power to the CPU 301, the ROM 303, and the HDD 304. As a result, the image forming apparatus 10 shifts from the second sleep state to the first sleep state.

(B) If PDL Job is Received

As illustrated in FIGS. 12 and 14, if the LAN controller 306 receives a PDL job, the LAN controller 306 inputs the signal NW-1 to the power supply control unit 401 (the signal level of the signal NW-1 becomes "high"). If the signal NW-1 becomes the "high" level, then in step S121, the power supply control unit 401 changes the signal level of the control signal H to "high". As a result, the switch 420 is changed to the ON state, and the first power supply unit 410 supplies power to the CPU 301, the ROM 303, and the HDD 304.

In step S122, the power supply control unit 401 changes the signal level of the control signal F to "high". As a result, the second power supply unit 411 and the third power supply unit 412 are powered on. In step S123, when the voltage levels of the second power supply unit 411 and the third power supply unit 412 stabilize, the power supply control unit 401 changes the signal levels of the control signals J and K to "high". As a result, power is supplied to the printer unit 14 and the scanner unit 13. As a result, the image forming apparatus 10 shifts from the second sleep state to the standby state. In this example, the power has been described to be supplied to both the printer unit 14 and the scanner unit 13 if a PDL job is received. However, the present exemplary embodiment is not limited thereto. For example, if a PDL job is received, the power may be supplied to the printer unit 14 and not to the scanner unit 13.

(C) If Button 121 is Pressed or if Human Body Detection Sensor 310 Detects Person As illustrated in FIGS. 12 and 15, if the user presses a button 121, the signal P is input from the button 121 to the power supply control unit 401 (the signal level of the signal P becomes "high"). If the human body detection sensor 310 detects a person, the signal Q is input from the human body detection sensor 310 to the power supply control unit 401 (the signal level of the signal Q becomes "high"). If the signal P or Q becomes the "high" level, then in step S130, the power supply control unit 401 changes the signal levels of the control signals S1 and T to "high". In step S131, the power supply control unit 401 changes the signal level of the control signal H to "high". As a result, the switch 420 is changed to the ON state, and the first power supply unit 410 supplies power to the CPU 301, the ROM 303, and the HDD 304.

In step S132, the power supply control unit 401 changes the signal level of the control signal F to "high". As a result, the second power supply unit 411 and the third power supply unit 412 are powered on. In step S133, when the voltage levels of the second power supply unit 411 and the third power supply unit 412 stabilize, the power supply control unit 401 changes the signal levels of the control signals J and K to "high". As a result, power is supplied to the printer unit 14 and the scanner unit 13. Thus, the image forming apparatus 10 shifts from the second sleep state to the standby state.

(D) If Timer 350 has Counted Predetermined Time

As illustrated in FIGS. 12 and 16, if the timer 350 has counted a predetermined time, the timer 350 inputs the signal R to the power supply control unit 401 (the signal level of the signal R becomes "high"). If the signal R becomes the "high level", then in step S140, the power supply control unit 401 changes the signal level of the control signal S2 to "high".

In step S142, the power supply control unit 401 changes the signal level of the control signal F to "high". As a result, the second power supply unit 411 and the third power supply unit 412 are powered on. In step S143, when the voltage levels of the second power supply unit 411 and the third power supply unit 412 stabilize, the power supply control unit 401 changes the signal level of the control signal J to "high". As a result, power is supplied to the printer unit 14. Thus, the image forming apparatus 10 shifts from the second sleep state to the adjustment state.

(E) If Document Detection Sensor 333 Detects Document

As illustrated in FIGS. 12 and 17, if the document detection sensor 333 detects a document, the document detection sensor 333 inputs the signal V to the power supply control unit 401 (the signal level of the signal V becomes "high"). If the signal V becomes the "high" level, then in step S150, the power supply control unit 401 changes the signal level of the control signal S1 to "high". In step S151, the power supply control unit 401 changes the signal level of the control signal H to "high". As a result, the switch 420 is changed to the ON state, and the first power supply unit 410 supplies power to the CPU 301, the ROM 303, and the HDD 304.

In step S152, the power supply control unit 401 changes the signal level of the control signal F to "high". As a result, the second power supply unit 411 and the third power supply unit 412 are powered on. In step S153, when the voltage levels of the second power supply unit 411 and the third power supply unit 412 stabilize, the power supply control unit 401 changes the signal levels of the control signals J and K to "high". As a result, power is supplied to the printer unit 14 and the scanner unit 13. As a result, the image forming apparatus 10 shifts from the second sleep state to the standby state.

(F) If Sheet Detection Sensor 312 Detects Sheet

As illustrated in FIGS. 12 and 18, if the sheet detection sensor 312 detects a sheet, the sheet detection sensor 312 inputs the signal W to the power supply control unit 401 (the signal level of the signal W becomes "high"). If the signal W becomes the "high" level, then in step S160, the power supply control unit 401 changes the signal level of the control signal T to "high". In step S161, the power supply control unit 401 changes the signal level of the control signal H to "high". As a result, the switch 420 is changed to the ON state, and the first power supply unit 410 supplies power to the CPU 301, the ROM 303, and the HDD 304.

In step S162, the power supply control unit 401 changes the signal level of the control signal F to "high". As a result, the second power supply unit 411 and the third power supply unit 412 are powered on. In step S163, when the voltage levels of the second power supply unit 411 and the third power supply unit 412 stabilize, the power supply control unit 401 changes the signal levels of the control signals J and K to "high". As a result, power is supplied to the printer unit 14 and the scan unit 13. Thus, the image forming apparatus 10 shifts from the second sleep state to the standby state.

<Return Processing of Printer Unit>

Figure 19A:
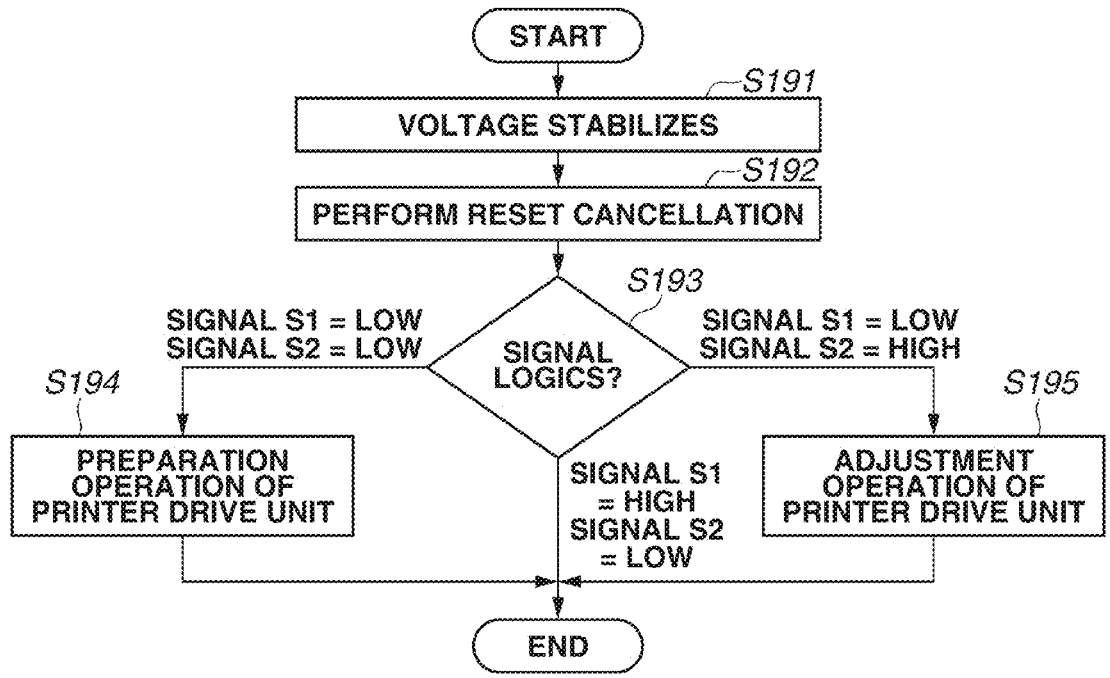
FIG. 19A is a flowchart illustrating return processing of a printer unit.

FIG. 19A is a flowchart illustrating return processing of the printer unit 14.

The return processing of the printer unit 14 will be described with reference to FIG. 19A.

In step S191, the voltage supplied from the second power supply unit 411 to the printer control unit 341 of the printer unit 14 stabilizes. In step S192, the printer control unit 341 performs reset cancellation. In step S193, the reset-canceled printer control unit 341 checks the logic of the signals input to the printer control unit 341.

If neither of the control signals S1 and S2 is input to the printer control unit 341 (the signal levels of the control signals S1 and S2 are both "low" levels; SIGNAL S1=LOW, SIGNAL S2=LOW in step S193), then in step S194, the printer control unit 341 performs a preparation operation of the printer control unit 342. The preparation operation refers to an operation to be performed before the printer unit 14 becomes ready for printing. The preparation operation includes a rotating operation of the photosensitive drum 1323 and a rotating operation of the fixing device 1327. When the preparation operation is completed, the printer unit 14 becomes ready for printing.

If the control signal S2 is input to the printer control unit 341 (the signal level of the control signal S2 is a "high" level; SIGNAL S1=LOW, SIGNAL S2=HIGH in step S193), then in step S195, the printer control unit 341 performs an adjustment operation of the printer drive unit 342. The blade for scraping toner off the surface of the photosensitive drum 1323 may leave a mark on the surface of the photosensitive drum 1323 if the photosensitive drum 1323 and the blade make contact with each other for a long time. The adjustment operation refers to an operation of changing the relative position between the photosensitive drum 1323 and the blade so that the blade leaves no mark. More specifically, the printer control unit 341 intermittently rotates the photosensitive drum 1323.

If the control signal S1 is input to the printer control unit 341 (the signal level of the control signal S1 is a "high" level; SIGNAL S1=HIGH, SIGNAL S2=LOW in step S193), the printer control unit 341 does not drive the printer drive unit 342.

<Return Processing of Scanner Unit>

Figure 19B:
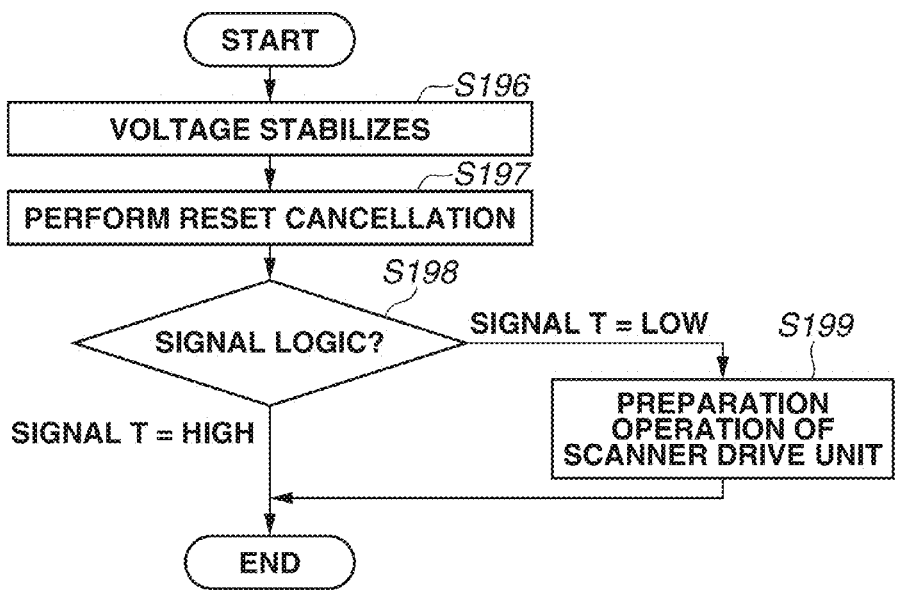
FIG. 19B is a flowchart illustrating return processing of a scanner unit.

FIG. 19B is a flowchart illustrating return processing of the scanner unit 13.

The return processing of the scanner unit 13 will be described with reference to FIG. 19B.

In step S196, the voltage supplied from the second power supply unit 411 to the scanner control unit 331 of the scanner unit 13 stabilizes. In step S197, the scanner control unit 331 performs reset cancellation. In step S198, the reset-canceled scanner control unit 331 checks the logic of the signal input to the scanner control unit 331.

If the control signal T is not input to the scanner control unit 331 (the signal level of the control signal T is a "low" level; SIGNAL T=LOW in step S198), then in step S199, the scanner control unit 331 performs a preparation operation of the scanner drive unit 332. The preparation operation refers to a preparation operation to be performed before the scanner unit 13 becomes ready for scanning. The preparation operation includes a homing operation of the optical unit 1213 and a lighting operation of the lamp 1212. When the preparation operation is completed, the scanner unit 13 becomes ready to read a document.

If the control signal T is input to the scanner control unit 331 (the signal level of the control signal T is a "high" level; SIGNAL T=HIGH in step S198), the scanner control unit 331 does not drive the scanner drive unit 332.

<Operation Flow when Print Function or Scan Function is Determined to be Used>

Figure 20:
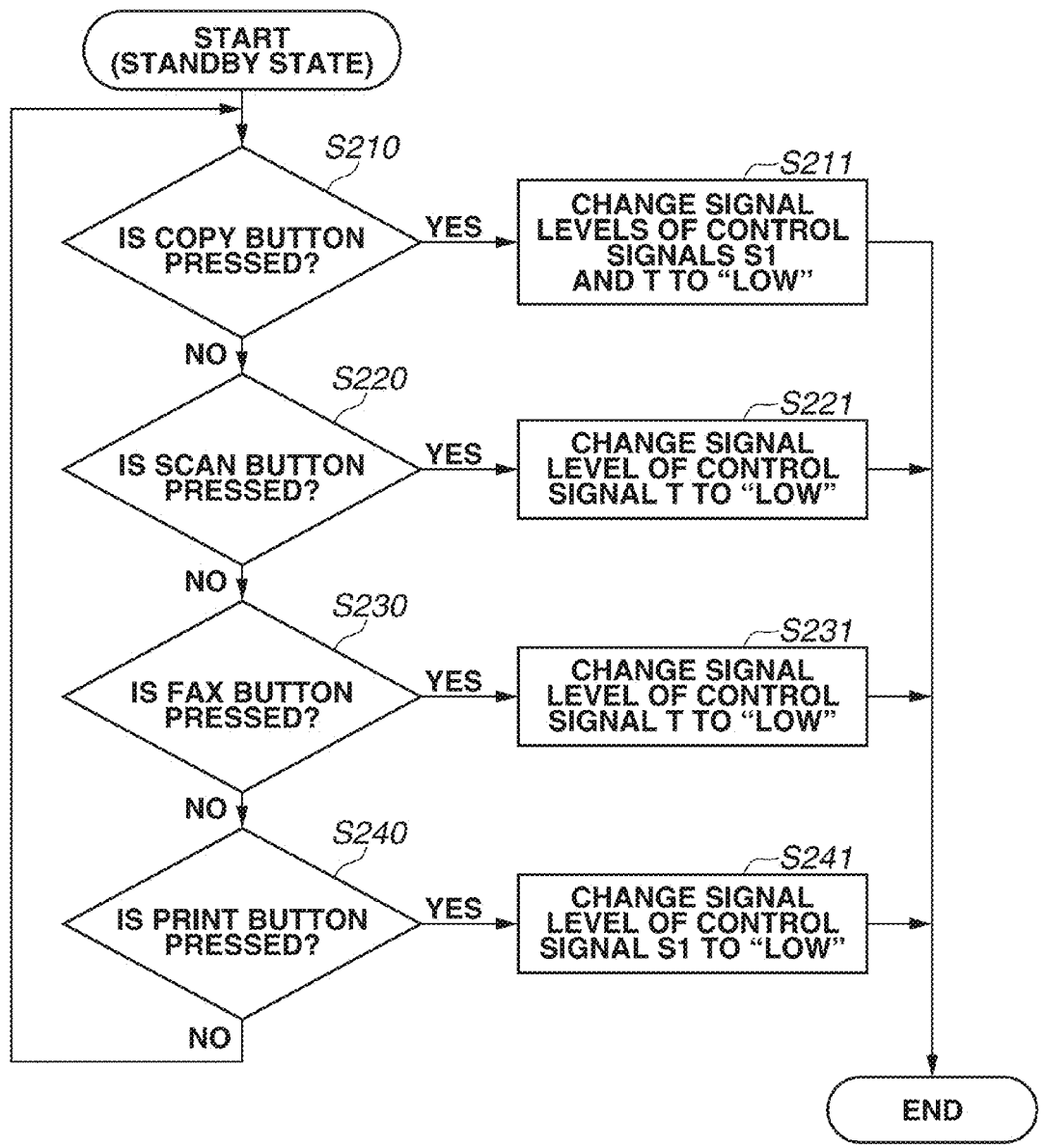
FIG. 20 is a flowchart illustrating an operation of the image forming apparatus when various function buttons displayed on the display unit are selected.

FIG. 20 is a flowchart illustrating an operation of the power supply control unit 401 when the user selects a function button on the selection screen displayed on the display unit 122. When the image forming apparatus 10 enters the standby state, the selection screen (see FIG. 2) is displayed on the display unit 122 of the operation unit 12. Here, an operation of the image forming apparatus 10 having entered the standby state with the signal levels of the control signals S1 and T "high" will be described.

In step S210, if the user presses the copy button 122a of the display unit 122 (YES in step S210), then in step S211, the power supply control unit 401 changes the signal levels of the control signals S1 and T to "low". The printer control unit 341 then performs the preparation operation of the printer drive unit 342. As a result, the printer unit 14 becomes ready for printing. The scanner control unit 331 performs the preparation processing of the scanner drive unit 332. As a result, the scanner unit 13 becomes ready to read a document. Consequently, the user can copy a document by using both the scan function and the print function.

In step S220, if the user presses the scan button 122b of the display unit 122 (YES in step S220), then in step S221, the power supply control unit 401 changes the signal level of the control signal T to "low". The signal level of the control signal S1 is maintained at "high". The scanner control unit 331 then performs the preparation operation of the scanner drive unit 332. As a result, the scanner unit 13 becomes ready to read a document. Here, the preparation operation of the printer drive unit 342 is restricted. Consequently, the user can store an image read by using the scan function into the HDD 304.

In step S230, if the user presses the FAX button 122c of the display unit 122 (YES in step S230), then in step S231, the power supply control unit 401 changes the signal level of the control signal T to "low". The signal level of the control signal S1 is maintained at "high". The scanner control unit 311 then performs the preparation operation of the scanner drive unit 332. As a result, the scanner unit 13 becomes ready to read a document. Here, the preparation operation of the printer drive unit 342 is restricted. Consequently, the user can facsimile image data on a document read by using the scan function.

In step S240, if the user presses the print button 122d of the display unit 122 (YES in step S240), then in step S241, the power supply control unit 401 changes the signal level of the control signal S1 to "low". The signal level of the control signal T is maintained at "high". The printer control unit 341 then performs the preparation processing of the printer drive unit 342. As a result, the printer unit 14 becomes ready for printing. Here, the preparation operation of the scanner drive unit 332 is restricted. Consequently, the user can perform printing based on a print job(s) stored in the HDD 304 and/or a print job(s) stored in a server by using the print function.

Effect of Present Exemplary Embodiment

According to the above-described configuration, if the image forming apparatus 10 receives a PDL job in the second sleep state, the image forming apparatus 10 can perform the preparation operation of the printer drive unit 342 without waiting for the user's operation on the selection screen. In other words, if the image forming apparatus 10 receives a PDL job, the printer unit 14 immediately becomes ready for printing.

If the human body detection sensor 310 detects a person or the buttons 121 are pressed in the second sleep state, the preparation operations of the printer unit 14 and the scanner unit 14 are restricted. In such a case, the driving systems of the printer unit 14 and the scanner unit 13 are not operated (the motors of the photosensitive drum 1323 and the fixing device 1327 are not driven). The image forming apparatus 10 therefore shifts quietly to the standby state without producing noise related to the operation of the driving systems.

After the shift to the standby state where the driving systems are not operated, the user may press one of the function buttons 122a to 122d to determine the function to use. In such a case, the driving system(s) of the printer unit 14 and/or the scanner unit 13 is/are operated. In the standby state where the driving systems are not operated, stable power has already been supplied to the printer unit 14 and the scanner unit 13, and the printer unit 14 and the scanner unit 13 have already been reset-cancelled as well. Consequently, the printer unit 14 becomes ready for printing and/or the scanner unit 13 becomes ready for reading immediately after the user presses one of the function buttons 122a to 122d.

If the document detection sensor 333 detects a document, the driving system of the scanner unit 13 performs the preparation operation and the driving system of the printer unit 14 does not perform the preparation operation. If the document detection sensor 333 detects a document, the scanner unit 13 is likely to be used. To make the function of the scanner unit 13 usable, the scanner drive unit 332 of the scanner unit 13 therefore performs the preparation operation. However, even though the document detection sensor 333 detects a document, whether to use the printer unit 14 is not determined. For example, the copy function may be performed. An image of the scanned document may be stored in the HDD 304, or may be facsimiled. The printer drive unit 342 of the printer unit 14 therefore does not perform the preparation operation. The printer drive unit 342 performs the preparation operation when the function of the printer unit 14 is determined to be used.

If the sheet detection sensor 312 detects a sheet, the driving system of the printer unit 14 performs the preparation operation, and the driving system of the scanner unit 13 does not perform the preparation operation. If the sheet detection sensor 312 detects a sheet, the printer unit 14 is likely to be used. To make the function of the printer unit 14 usable, the printer drive unit 342 of the printer unit 14 therefore performs the preparation operation. However, even though the sheet detection sensor 312 detects a sheet, whether to use the scanner function is not determined. The scanner drive unit 332 of the scanner unit 13 therefore does not perform the preparation operation. The scanner drive unit 332 performs the preparation operation when the function of the scanner unit 13 is determined to be used.

The above-described exemplary embodiment has dealt with the case where the power supply control unit 401, a hardware logic circuit, performs the steps illustrated in FIGS. 12 and 20. However, the present exemplary embodiment is not limited thereto. The power supply control unit 401 may be a processor, and the processor may execute a program to perform the steps illustrated in FIGS. 12 and 20.

The functions illustrated in the flowcharts of the present exemplary embodiment may be implemented by a processing apparatus (CPU or processor), such as a personal computer, executing software (program) obtained via a network or various storage media.

The image forming apparatus according to the present exemplary embodiment can prevent the useless consumption of power and the production of noise by the preparation operation of the printer unit and the like when the image forming apparatus returns from the power saving state.

The image forming apparatus according to the present exemplary embodiment supplies power to the printer unit and the like before the printer unit and the like are determined to be used. The image forming apparatus can thus reduce time for the functions of the printer unit and the like to become usable when the printer unit and the like are determined to be used.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
a printer configured to form an image on a sheet;
a display configured to display an information;
a human sensor configured to detect a human; and
a controller configured to turn on the display without performing a preparation operation for putting the printer into a printable state on a basis of a detection result of the human sensor and then to control to perform the preparation operation on a basis of receiving a user instruction via a screen displayed on the display.

2. The image forming apparatus according to claim 1, wherein the preparation operation of the printer includes an operation of rotating a photosensitive drum of the printer.

3. The image forming apparatus according to claim 1, wherein the preparation operation of the printer includes an operation of driving a motor of the printer.

4. The image forming apparatus according to claim 3, wherein the motor is a motor to rotate a photosensitive drum, a motor to convey a sheet on which an image has been formed by the printer or a sheet on which an image is to be formed by the printer, or a motor to drive a fixing device.

5. The image forming apparatus according to claim 1, wherein the controller controls not to perform the preparation operation on the basis of the detection result of the human sensor.

6. The image forming apparatus according to claim 1, further comprising a network controller configured to receive, from an external device, a print request to cause the printer to form an image on a sheet,
wherein the controller controls to perform the preparation operation on a basis of receiving the print request.

7. The image forming apparatus according to claim 1, further comprising a button configured to receive a user instruction to return the image forming apparatus from a power saving state,
wherein the controller turns on the display on a basis of receiving the user instruction via the button and then to control to perform the preparation operation on a basis of receiving a user instruction via a screen displayed on the display.

8. The image forming apparatus according to claim 1, further comprising
wherein the controller outputs a signal on the basis of a detection result of the human sensor,
wherein the printer does not perform the preparation operation while the signal is input.

9. The image forming apparatus according to claim 8, wherein the controller stops outputting the signal on the basis of receiving the user instruction via the screen displayed on the display.

10. The image forming apparatus according to claim 1, further comprising a sheet detection sensor configured to detect a sheet on which an image is to be formed by the printer,
wherein the controller controls to perform the preparation operation on a basis of the sheet being detected by the sheet detection sensor.

11. The image forming apparatus according to claim 1, further comprising:
a reader configured to read an image of a document; and
a document detection sensor configured to detect a document to be read by the reader,
wherein the controller turns on the display on a basis of the document being detected by the document detection sensor and then to control perform the preparation operation on a basis of receiving a user instruction via a screen displayed on the display.

12. A method for controlling an image forming apparatus including an printer configured to form an image on a sheet, the method comprising:
displaying an information on a display;
using a human sensor to detect a human; and
providing control to turn on the display without performing a preparation operation for putting the printer into a printable state on a basis of a detection result of the human sensor and then providing control to perform the preparation operation on a basis of receiving a user instruction via a screen displayed on the display.

13. The method according to claim 12, wherein the preparation operation of the printer includes an operation of rotating a photosensitive drum of the printer.

14. The method according to claim 12, wherein the preparation operation of the printer includes an operation of driving a motor of the printer.

15. The method according to claim 14, wherein the motor is a motor to rotate a photosensitive drum, a motor to convey a sheet on which an image has been formed by the printer or a sheet on which an image is to be formed by the printer, or a motor to drive a fixing device.

* * * * *